United States Patent
Itatsu

(10) Patent No.: US 11,314,501 B2
(45) Date of Patent: Apr. 26, 2022

(54) ON-BOARD UPDATE DEVICE, ON-BOARD UPDATE SYSTEM, UPDATE PROCESS METHOD, AND UPDATE PROCESS PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Taro Itatsu, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 14 days.

(21) Appl. No.: 17/044,392

(22) PCT Filed: Apr. 2, 2019

(86) PCT No.: PCT/JP2019/014565
§ 371 (c)(1),
(2) Date: Oct. 1, 2020

(87) PCT Pub. No.: WO2019/202965
PCT Pub. Date: Oct. 24, 2019

(65) Prior Publication Data
US 2021/0103438 A1 Apr. 8, 2021

(30) Foreign Application Priority Data
Apr. 20, 2018 (JP) .............................. JP2018-081433

(51) Int. Cl.
*G06F 8/65* (2018.01)
*B60R 16/023* (2006.01)
(Continued)

(52) U.S. Cl.
CPC .............. *G06F 8/65* (2013.01); *B60R 16/023* (2013.01); *G06N 7/005* (2013.01); *H04L 67/12* (2013.01); *H04L 67/34* (2013.01)

(58) Field of Classification Search
CPC ......................................................... G06F 8/65
See application file for complete search history.

(56) References Cited

U.S. PATENT DOCUMENTS

| 10,552,143 B2 | 2/2020 | Nakano |
| 2003/0053419 A1 * | 3/2003 | Kanazawa ................ H04L 1/20 370/252 |

(Continued)

FOREIGN PATENT DOCUMENTS

JP 2010-139325 A 6/2010

OTHER PUBLICATIONS

International Search Report, Application No. PCT/JP2019/014565, dated May 7, 2019. ISA/Japan Patent Office.

*Primary Examiner* — Jae U Jeon
(74) *Attorney, Agent, or Firm* — Honigman LLP

(57) ABSTRACT

Provided are an on-board update device, an on-board update system, an update process method, and an update process program. The on-board update device updates a program or data stored in a storage unit of an on-board device, the on-board update device includes a communication unit performing communication via a communication line connected to the on-board device, a storage unit stores history information regarding the timing of transmission and reception of data that is to be transmitted and received via the communication line, an estimation processing unit estimates an unused time period in which no data is transmitted or received via the communication line, based on the history information stored in the storage unit, and an update processing unit performs processing for transmitting, via the communication unit data for updating the on-board device to (Continued)

the on-board device in the unused time period estimated by the estimation processing unit.

14 Claims, 15 Drawing Sheets

(51) Int. Cl.
*G06N 7/00* (2006.01)
*H04L 67/12* (2022.01)
*H04L 67/00* (2022.01)

(56) References Cited

U.S. PATENT DOCUMENTS

| | | |
|---|---|---|
| 2006/0250301 A1 | 11/2006 | Yamakoshi et al. |
| 2013/0339721 A1 | 12/2013 | Yasuda |
| 2017/0192770 A1* | 7/2017 | Ujiie .................. H04L 12/4625 |
| 2018/0131625 A1* | 5/2018 | Kam .................. H04L 49/9021 |
| 2020/0396165 A1* | 12/2020 | Kurihara ................ H04L 67/14 |

* cited by examiner

ON-BOARD UPDATE DEVICE, ON-BOARD UPDATE SYSTEM, UPDATE PROCESS METHOD, AND UPDATE PROCESS PROGRAM

CROSS-REFERENCE TO RELATED APPLICATIONS

This application is the U.S. national stage of PCT/JP2019/014565 filed on Apr. 2, 2019, which claims priority of Japanese Patent Application No. JP 2018-081433 filed on Apr. 20, 2018, the contents of which are incorporated herein.

TECHNICAL FIELD

The present disclosure relates to an on-board update device, an on-board update system, an update process method, and an update process program, for updating programs or data in on-board devices installed in a vehicle.

BACKGROUND

A vehicle is conventionally equipped with a plurality of on-board devices such as ECUs (Electronic Control Units), which are connected via communication lines such as CAN (Controller Area Network) buses and thereby capable of transmitting and receiving information to/from each other. In each ECU that is in charge of vehicle control or a like process, a processor such as a CPU (Central Processing Unit) retrieves and executes a program stored in a storage unit such as a flash memory or EEPROM (Electrically Erasable Programmable Read Only Memory). The program or data stored in the storage unit of each ECU needs to be updated with a new program or data, for example, when it is required to add a function, to correct a fault, to upgrade, etc. In this case, an update program or data is transmitted via a communication line to the ECU to be updated.

JP 2017-215890A discloses a program update method for storing a plurality of update programs with which a plurality of control devices need simultaneous updating and a topology of an on-board network, and for transmitting a plurality of programs in parallel to control devices that belongs to a plurality of on-board networks that are each connected to a relay apparatus and are independent of each other.

Programs or data for updating an on-board device are split into sizes suitable for in-vehicle communication, and are transmitted to the on-board device via a communication line arranged in the vehicle. However, data necessary for controlling vehicle movement and the like are transmitted and received via this communication line, and thus there is a concern that the communication load on the communication line may increase through transmission of update data. Although it is possible to reduce the amount of update data transmitted, the frequency of data transmission, and the like in order to inhibit an increase in the communication load, this increases the time required to complete the transmission of update data.

The present disclosure is made in view of such circumstances, and aims to provide an on-board update device, an on-board update system, an update process method, and an update process program with which it is expected that the influence of an increase in communication load is suppressed and the time taken to complete the transmission of update data is shortened.

SUMMARY

An on-board update device according to this aspect is configured to update a program or data stored in a storage unit of an on-board device installed in a vehicle, the on-board update device including a communication unit configured to perform communication via a communication line connected to the on-board device, a storage unit configured to store history information regarding timing of transmission and reception of data that is to be transmitted and received via the communication line, an estimation processing unit configured to estimate an unused time period in which no data is transmitted or received via the communication line, based on the history information stored in the storage unit, and an update processing unit configured to perform processing for transmitting, via the communication unit, data for updating the on-board device to the on-board device in the unused time period estimated by the estimation processing unit.

An on-board update system according to this aspect includes an on-board update device configured to update a program or data stored in a storage unit of an on-board device installed in a vehicle, and a server device that is provided outside the vehicle and is configured to communicate with the on-board update device. The on-board update device includes a communication unit configured to perform communication via a communication line connected to the on-board device, a storage unit configured to store history information regarding timing of transmission and reception of data that is to be transmitted and received via the communication line, an estimation processing unit configured to estimate an unused time period in which no data is transmitted or received via the communication line, based on the history information stored in the storage unit, and an update processing unit configured to perform processing for transmitting, via the communication unit, data for updating the on-board device to the on-board device in the unused time period estimated by the estimation processing unit.

An update process method according to this aspect is an update process method for updating a program or data stored in a storage unit of an on-board device installed in a vehicle, the update process method including storing, in the storage unit, history information regarding timing of transmission and reception of data that is to be transmitted and received via a communication line connected to the on-board device, estimating an unused time period in which no data is transmitted or received via the communication line, based on the history information stored in the storage unit, and transmitting data for updating the on-board device in the estimated unused time period.

An update process program according to this aspect is an update process program for causing a computer to perform processing for updating a program or data stored in a storage unit of an on-board device installed in a vehicle, the update process program causing the computer to perform processing for storing, in the storage unit, history information regarding timing of transmission and reception of data that is to be transmitted and received via a communication line connected to the on-board device, estimating an unused time period in which no data is transmitted or received via the communication line, based on the history information stored in the storage unit, and transmitting data for updating the on-board device in the estimated unused time period.

Note that this application can be realized as not only an on-board update device including such characteristic processing units but also an update process method including such characteristic processes as steps or an update process program for causing a computer to execute these steps. Also, this application can be realized as a semiconductor integrated circuit for realizing part or the entirety of the on-board update device or as another device or a system including the on-board update device.

Advantageous Effects of Disclosure

According to the above configuration, it is expected that the influence of an increase in communication load is suppressed, and the time taken to complete the transmission of update data is shortened.

DETAILED DESCRIPTION OF PREFERRED EMBODIMENTS

Figure 1:
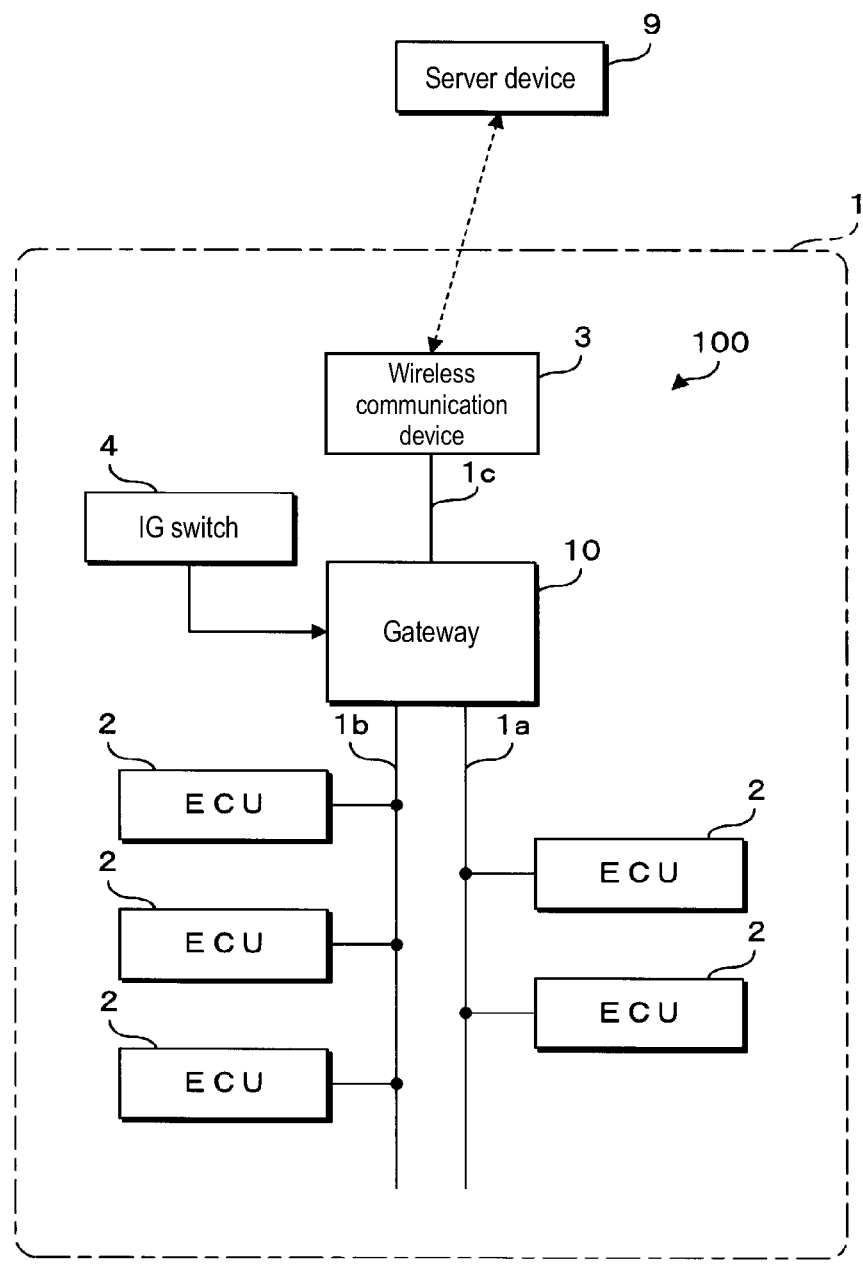
FIG. 1 is a block diagram showing a configuration of an on-board update system according to this embodiment.

Embodiments of the present disclosure will be described first. At least some embodiments described below may also be combined.

An on-board update device according to this aspect is configured to update a program or data stored in a storage unit of an on-board device installed in a vehicle, the on-board update device including a communication unit configured to perform communication via a communication line connected to the on-board device, a storage unit configured to store history information regarding timing of transmission and reception of data that is to be transmitted and received via the communication line, an estimation processing unit configured to estimate an unused time period in which no data is transmitted or received via the communication line, based on the history information stored in the storage unit, and an update processing unit configured to perform processing for transmitting, via the communication unit, data for updating the on-board device to the on-board device in the unused time period estimated by the estimation processing unit.

In this aspect, a program or data stored in the storage unit of the in-vehicle device is updated as a result of the on-board update device installed in the vehicle transmitting update data via the in-vehicle communication line to the on-board device. The on-board update device monitors data that is transmitted and received via the communication line connected to the on-board device, and stores history information about the timing of transmission and reception of data that is to be transmitted and received via this communication line. When the on-board update device performs an update process, the on-board update device estimates an unused time period in which no data is transmitted or received via the communication line, based on the history information stored about the communication line connected to the on-board device to be updated, and transmits update data in the estimated unused time period. Accordingly, the on-board communication device can transmit update data using a time period in which no normal communication is performed via the communication line, and thus can prevent the transmission of update data from inhibiting normal communication, and also can shorten the time taken to complete the transmission of update data due to an unused time period in which the communication line is not used being effectively utilized.

It is preferable that the on-board update device includes a generation processing unit configured to generate information about a probability distribution of timing when data is transmitted and received to/from the communication line, based on timing when data has been transmitted and received to/from the communication line, and the storage unit is configured to store, as the history information, information about the probability distribution generated by the generation processing unit.

In this aspect, the on-board update device generates information about the probability distribution of the timing when data is transmitted and received to/from this communication line, based on the timing when data has been actually transmitted and received to/from the communication line, and stores the generated information about the probability distribution as history information. Accordingly, the on-board update device can accurately find out the usage status of the communication line in normal communication.

It is preferable that data that is transmitted and received via the communication line includes an identification code for identifying the data, and the generation processing unit is configured to generate information about a probability distribution for each identification code.

In this aspect, data that is transmitted and received via the communication line includes an identification code, and the on-board communication device generates information about a probability distribution for each identification code, and stores the information as history information. Accordingly, it is possible to reduce the spread (variance) in the probability distribution of data or the like that is transmitted in a fixed cycle, for example, and to more accurately find out the usage status of the communication line.

It is preferable that the estimation processing unit is configured to estimate, based on the information about the probability distribution, as the unused time period, a time slot in which the probability that data is transmitted and received to/from the communication line is lower than a predetermined reference.

In this aspect, the on-board update device estimates, based on information about the probability distribution stored as history information, as an unused time period in which the communication line is not used, a time slot in which the probability that data is transmitted and received to/from the communication line is lower than the predetermined reference. Accordingly, the on-board update device can transmit update data using information about the probability distribution stored as history information, at the timing when the communication line is unlikely to be used.

It is preferable that the generation processing unit is configured to generate information about the probability distribution by updating initial information about the probability distribution that has been input from a device outside the vehicle.

In this aspect, the on-board update device acquires initial information about a probability distribution from a server device outside the vehicle, and generates information about the probability distribution by updating the acquired initial information. Accordingly, even if an update process needs to be performed immediately after the vehicle is manufactured, or immediately after the vehicle is sold, for example, and before sufficient history information is stored, the on-board update device can determine the timing of transmission of update data, based on the initial information.

It is preferable that the on-board update device includes a history information transmission unit configured to transmit the history information stored in the storage unit to the external device.

In this aspect, the on-board update device transmits the history information stored in the storage unit to an external server device. Accordingly, the server device can generate more accurate initial information based on the history information obtained from a plurality of vehicles, for example.

It is preferable that the storage unit is configured to store the history information for each state of the vehicle.

In this aspect, the on-board update device acquires the state of the vehicle, such as whether the engine of the vehicle is ON or OFF, or whether or not the vehicle is moving, for example, and stores history information for each state of the vehicle. If the state of the vehicle changes, the frequency and timing when the on-board device transmits data may change, for example. As a result of the on-board update device storing history information for each state of the vehicle, it is possible to estimate an unused time period suitable for the state of the vehicle.

An on-board update system according to this aspect includes an on-board update device configured to update a program or data stored in a storage unit of an on-board device installed in a vehicle, and a server device that is provided outside the vehicle and is configured to communicate with the on-board update device. The on-board update device includes a communication unit configured to perform communication via a communication line connected to the on-board device, a storage unit configured to store history information regarding timing of transmission and reception of data that is to be transmitted and received via the communication line, an estimation processing unit configured to estimate an unused time period in which no data is transmitted or received via the communication line, based on the history information stored in the storage unit, and an update processing unit configured to perform processing for transmitting, via the communication unit, data for updating the on-board device to the on-board device in the unused time period estimated by the estimation processing unit.

In this aspect, in a manner similar to that of Aspect (1), it is possible to prevent the transmission of update data from inhibiting normal communication, and to shorten the time taken to complete the transmission of update data.

It is preferable that the on-board update device includes a generation processing unit configured to generate, based on timing when data has been transmitted and received to/from the communication line, information about a probability distribution of timing when data is transmitted and received to/from the communication line, in which the storage unit is configured to store, as the history information, the information about the probability distribution generated by the generation processing unit.

In this aspect, in a manner similar to that of Aspect (2), the on-board update device can accurately find out the usage status of the communication line in normal communication.

It is preferable that the server device includes a delivering unit configured to deliver initial information about the probability distribution to the on-board update device, in which the generation processing unit is configured to generate information about the probability distribution by updating the initial information delivered by the server device.

In this aspect, in a manner similar to that of Aspect (5), even if an update process needs to be performed immediately after the vehicle is manufactured, or immediately after the vehicle is sold, for example, and before sufficient history information is stored, the on-board update device can determine the timing of transmission of update data, based on the initial information.

It is preferable that the on-board update device includes a history information transmission unit configured to transmit history information stored in the storage unit to the server device, in which the server device includes a history information receiving unit configured to receive history information transmitted by the on-board update device, and an initial information update unit configured to update the initial information based on the history information received by the history information receiving unit.

In this aspect, in a manner similar to that of Aspect (6), the server device can generate more accurate initial information based on the history information obtained from a plurality of vehicles, for example.

An update process method according to this aspect is an update process method for updating a program or data stored in a storage unit of an on-board device installed in a vehicle, the method including storing, in the storage unit, history information regarding timing of transmission and reception of data that is to be transmitted and received via a communication line connected to the on-board device, estimating an unused time period in which no data is transmitted or received via the communication line, based on the history information stored in the storage unit, and transmitting data for updating the on-board device in the estimated unused time period.

In this aspect, in a manner similar to that of Aspect (1), it is possible to prevent the transmission of update data from inhibiting normal communication, and to shorten the time taken to complete the transmission of update data.

An update process program according to this aspect is an update process program for causing a computer to perform processing for updating a program or data stored in a storage unit of an on-board device installed in a vehicle, the update process program causing the computer to perform processing for storing, in the storage unit, history information regarding timing of transmission and reception of data that is to be transmitted and received via a communication line connected to the on-board device, estimating an unused time period in which no data is transmitted or received via the communication line, based on the history information stored in the storage unit, and transmitting data for updating the on-board device in the estimated unused time period.

In this aspect, in a manner similar to that of Aspect (1), it is possible to prevent the transmission of update data from inhibiting normal communication, and to shorten the time taken to complete the transmission of update data.

Specific examples of an on-board update system according to embodiments of the present disclosure will be described with reference to the drawings. Note that the present disclosure is not limited to these examples, but is indicated by the scope of the claims, and all changes that come within the meaning and range of equivalency of the claims are intended to be embraced therein.

Embodiment 1

System Overview

FIG. 1 is a block diagram showing the configuration of an on-board update system according to this embodiment. An on-board update system 100 according to this embodiment includes a plurality of ECUs 2, one wireless communication device 3, and one gateway 10 that are installed in a vehicle 1. The ECUs 2 are each connected to either a communication line 1a or 1b, and can communicate with each other via the connected communication line 1a or 1b. In the example shown in FIG. 1, two ECUs 2 are connected to the communication line 1a, three ECUs 2 are connected to the communication line 1b, and the two communication lines 1a and 1b are connected to the gateway 10. The gateway 10 relays communication between the communication lines 1a and 1b, and thereby the plurality of ECUs 2 enable communication via the communication lines 1a and 1b and the gateway 10.

Also, in the on-board update system 100 according to this embodiment, the wireless communication device 3 is connected to the gateway 10 via a communication line 1c. Via the wireless communication device 3, the gateway 10 can communicate with a server device 9 installed outside the vehicle 1. Also, the gateway 10 receives an IG signal from an IG (ignition) switch 4 in the vehicle 1.

The ECUs 2 may include various kinds of ECUs such as an ECU that controls the engine operation of the vehicle 1, an ECU that controls locking/unlocking of the doors, an ECU that controls on/off of the lighting, an ECU that controls the airbag operation, and an ECU that controls the ABS (Antilock Brake System) operation. Each of the ECUs 2 is connected to the communication line 1a or 1b arranged in the vehicle 1, and is capable of transmitting data to and receiving data from the other ECUs 2 and the gateway 10 via the communication lines 1a and 1b.

The wireless communication device 3 can communicate with the server device 9 installed outside the vehicle 1, for example, by wireless communication on a mobile telephone communication network, a wireless LAN (Local Area Network), or the like. The wireless communication device 3 can relay the communication between the gateway 10 and the server device 9, by transmitting the data provided by the gateway 10 to the server device 9 and providing the data received from the server device 9 to the gateway 10.

The gateway 10 is connected with the communication lines 1a to 1c that constitute an in-vehicle network for the vehicle 1, and relays data transmitted and received on these communication lines. In the example shown in FIG. 1, the gateway 10 is connected with three communication lines 1a to 1c, namely, the first communication line 1a connected with two ECUs 2, the second communication line 1b connected with three ECUs 2, and the third communication line 1c connected with the wireless communication device 3. The gateway 10 relays data by receiving data from any of the communication lines 1a to 1c and transmitting the received data to the other communication lines 1a to 1c.

The IG switch 4, which is a user-operated switch that is used to start the engine of the vehicle 1 or to perform a like operation, changes over between two states, i.e., between on and off. The IG signal indicates the state of the IG switch 4. When the IG signal indicates on, the motor of the vehicle 1 (e.g., an engine) is in operation, and an alternator or the like is generating power. When the IG signal indicates off, the motor of the vehicle 1 is not in operation, and an alternator or the like generates no power.

The server device 9 manages and stores the programs and data to be executed by the ECUs 2 installed in the vehicle 1. In response to an inquiry from the vehicle 1, the server device 9 informs the vehicle whether any program or the like needs updating. If an update is necessary, the server device 9 delivers an update program and data to the vehicle 1.

In the on-board update system 100 according to this embodiment, the gateway 10 periodically communicates with the server device 9 via the wireless communication device 3, and checks whether a program or data stored in the ECUs 2 needs updating. If a program or data needs updating, the gateway 10 acquires an update program or data (simply referred to as "update data" hereinafter) from the server device 9, and stores the acquired update data in a memory of the gateway 10. The gateway 10 split the update data acquired from the server device 9 into appropriate data sizes, and transmits, in order, the split data to the communication lines 1a and 1b connected to the ECUs 2 to be updated, and thereby updates the ECUs 2. The ECUs 2 receive the update data transmitted from the gateway 10 and store the update data in their memories. After the ECUs 2 have received all the split data, the ECUs 2 update their programs or data by changing the programs or data to be executed by the ECUs 2 to the stored update data.

In the on-board update system 100 in this embodiment, the ECUs 2 perform normal operations while the vehicle 1 is moving, for example, and even if the ECUs 2 are performing normal communication, the gateway 10 can transmit update data to the ECUs 2. At this time, the gateway 10 according to this embodiment estimates the unused time periods of the communication lines 1a and 1b (time periods in which no ECUs 2 transmit data to the communication lines 1a and 1b), and transmits update data in the estimated unused time period, so as not to prevent normal communication of the communication lines 1a and 1b. Thus, when a plurality of ECUs 2 are performing normal communication, the gateway 10 monitors data that is transmitted and received on the communication lines 1a and 1b, and acquires information about the timings and time periods in which data is transmitted and received, for example. The gateway 10 calculates, based on the acquired information, a distribution of the probability that data is transmitted and received via the communication lines 1a and 1b, and stores information about this distribution as history information. If update data needs to be transmitted, the gateway 10 transmits update data (data obtained by splitting update data) based on the stored history information in a time period in which the communication lines 1a and 1b are unlikely to be used.

Device Configuration

Figure 2:
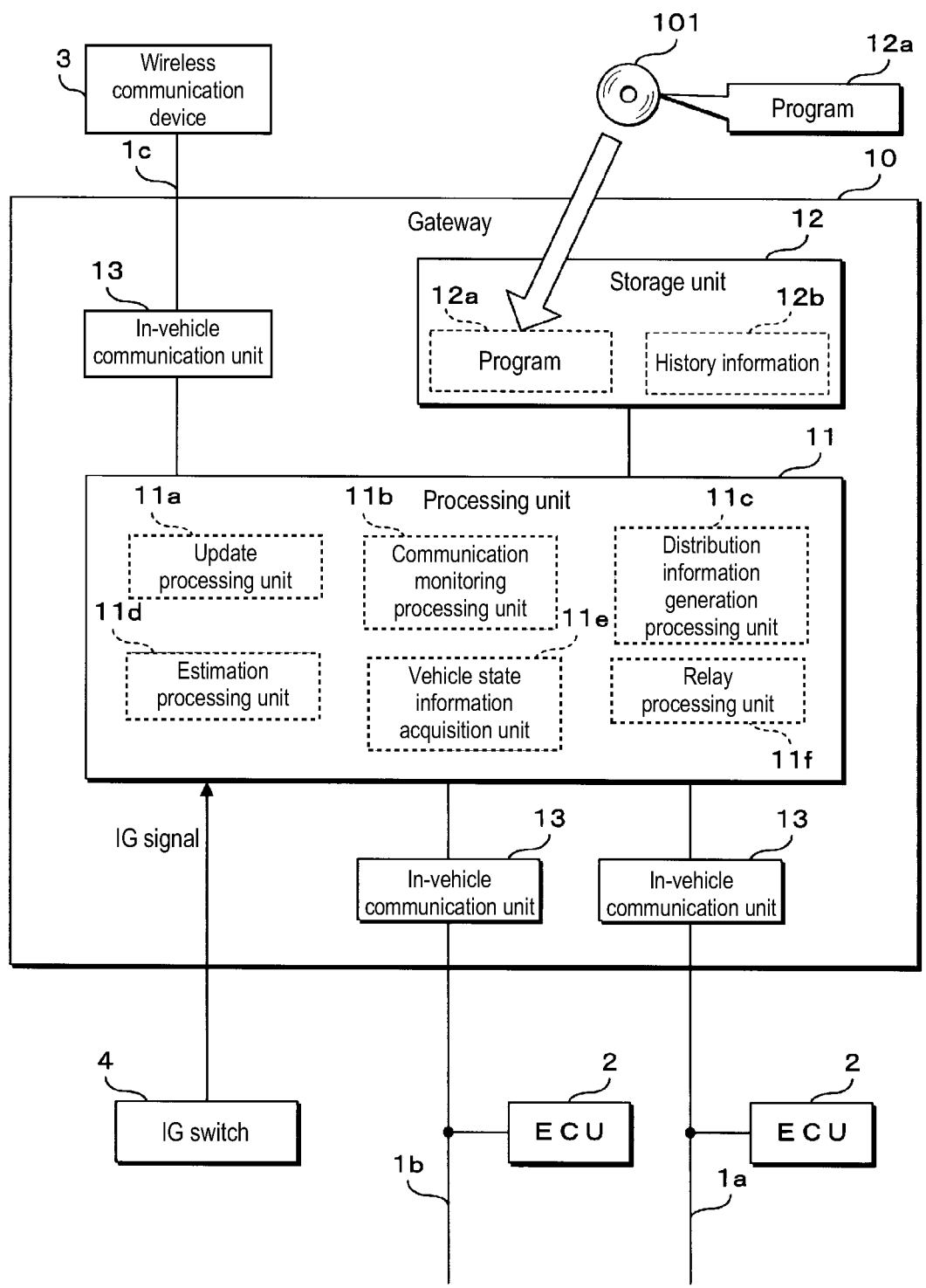
FIG. 2 is a block diagram showing a configuration of a gateway according to this embodiment.

FIG. 2 is a block diagram showing the configuration of the gateway 10 according to this embodiment. The gateway 10 according to this embodiment includes a processing unit (processor) 11, a storage unit (storage) 12, and in-vehicle communication units (transceivers) 13, and the like. The processing unit 11 is constituted, for example, by an arithmetic processing unit such as a CPU (Central Processing Unit) or an MPU (Micro-Processing Unit). The processing unit 11 performs various arithmetic operations by retrieving and executing a program 12a stored in the storage unit 12, a ROM (Read Only Memory) (not shown), or the like. In this embodiment, the processing unit 11 performs arithmetic operations necessary for relaying the transmission and reception of data between the communication lines 1a to 1c on the in-vehicle network, and updating the ECUs 2, and the like. The processing unit 11 also receives the IG signal supplied from the IG switch 4 in the vehicle 1. However, the IG signal may also be input to the gateway 10 through in-vehicle communication, using the communication lines 1a to 1c.

The storage unit 12 is constituted by a non-volatile memory device such as a flash memory or EEPROM (Electrically Erasable Programmable Read Only Memory). The storage unit 12 stores various programs to be executed by the processing unit 11 and data necessary for processing performed by the processing unit 11. In this embodiment, the storage unit 12 stores not only the program 12a to be executed by the processing unit 11 but also history information 12b as data necessary for execution of the program 12a. Note that the program 12a may be written to the storage unit 12 in the step of manufacturing the gateway 10, the gateway 10 may acquire the program 12a delivered by a remote server device or the like through communication, the gateway 10 may retrieve the program 12a recorded in a recording medium 101 such as a memory card or an optical disk and store the program 12a in the storage unit 12, or a writing device may retrieve the program 12a recorded in the recording medium 101 and write the program 12a to the storage unit 12 of the gateway 10, for example. The program 12a may be delivered via a network, or may be recorded in the recording medium 101 and provided.

In this embodiment, the history information 12b is stored in the storage unit 12. The history information 12b is information generated by the gateway 10. The gateway 10 monitors the transmission and reception of data performed by the ECUs 2 to/from the communication lines 1a and 1b, acquires temporal information such as the timings and time periods in which data is transmitted and received, and generates the history information 12b. The history information 12b of the storage unit 12 is updated according to processing for monitoring the communication lines 1a and 1b performed by the gateway 10.

The gateway 10 includes three in-vehicle communication units 13 in this embodiment. The in-vehicle communication units 13 are each connected to one of the communication lines 1a to 1c that constitute the in-vehicle network, and transmit and receive data according to a predetermined communication protocol. Although it is presumed that the in-vehicle communication units 13 transmit and receive data based on CAN communication standards in this embodiment, a communication standard other than CAN may also be applied. The in-vehicle communication units 13 transmit information by converting data provided by the processing unit 11 into an electric signal and outputting the electric signal to the communication lines 1a to 1c. The in-vehicle communication units 13 receive data by sampling the electrical potentials at the communication lines 1a to 1c, and provides the thus received data to the processing unit 11. Note that the three in-vehicle communication units 13 provided in the gateway 10 may follow different communication protocols.

Also, the processing unit 11 executes the program 12a stored in the storage unit 12, and thereby enables software-like functional blocks such as an update processing unit 11a, a communication monitoring processing unit 11b, a distribution information generation processing unit 11c, an estimation processing unit 11d, a vehicle state information acquisition unit 11e, and a relay processing unit 11f. The update processing unit 11a periodically makes an inquiry as to whether the programs or data in the ECUs 2 installed in the vehicle 1 need updating, through communication with the server device 9 via the wireless communication device 3. If an update is necessary, the update processing unit 11a acquires (downloads) the update data from the server device 9 and stores the acquired update data in the storage unit 12. Then, the update processing unit 11a transmits the update data to the communication line 1a or 1b connected to the ECUs 2 to be updated, and thereby causes the ECUs 2 to update the programs or data.

The communication monitoring processing unit 11b monitors the transmission and reception of data performed via the communication lines 1a and 1b connected to the ECUs 2 that can be updated. If one of the ECUs 2 transmits data to the communication lines 1a and 1b, the communication monitoring processing unit 11b acquires information about the timing when the transmission of data is started, the timing when the transmission of data is complete, a time period in which data is transmitted, and an identification code (CAN-ID in this embodiment) included in data. The communication monitoring processing unit 11b provides the acquired information to the distribution information generation processing unit 11c.

The distribution information generation processing unit 11c generates information about a distribution of the probability that data is transmitted and received via the communication lines 1a and 1b, based on the information acquired by the communication monitoring processing unit 11b. Information about the probability distribution generated by the distribution information generation processing unit 11c is stored in the storage unit 12 as the history information 12b. The distribution information generation processing unit 11c generates information about a probability distribution for each state of the vehicle, for each of the communication lines 1a and 1b, and for each identification code included in data. A probability distribution may be expressed as a distribution of the probability that the next data will be transmitted with respect to the time passed since certain data is transmitted, for example.

The estimation processing unit 11d estimates a time period in which data is unlikely to be transmitted and received on the communication lines 1a and 1b, that is, unused time periods in which no communication lines 1a and 1b are used, based on the history information 12b stored in the storage unit 12, that is, based on information about a probability distribution generated by the distribution information generation processing unit 11c. The estimation processing unit 11d obtains a distribution of the probability that data is transmitted and received via the communication line 1a by retrieving, from the storage unit 12, information about a probability distribution of data that may be transmitted and received via the communication line 1a, and combining information about a plurality of probability distributions. The estimation processing unit 11d can extract a time period in which the probability that data is transmitted and received is lower than a predetermined threshold, and estimate the extracted time period as an unused time period in which the communication line 1a is not used. The update processing unit 11a transmits update data in the unused time period estimated by the estimation processing unit 11d.

The vehicle state information acquisition unit 11e acquires information regarding the state of the vehicle 1. In this embodiment, the vehicle state information acquisition unit 11e acquires information by sampling the values of the IG signals input by the IG switch 4, and determines whether the vehicle 1 is in a state where the IG signal is ON or in a state where the IG signal is OFF by determining whether the IG signal indicates ON or OFF. However, the state of the vehicle 1 is not limited to the states where the IG signal is ON and OFF, and the vehicle state information acquisition unit 11e may acquire various states other than the states where the IG signals are ON and OFF. The vehicle state information acquisition unit 11e may acquire various types of information such as the state of an ACC (accessory) switch of the vehicle 1, the vehicle speed of the vehicle 1, the open and closed states of doors of the vehicle 1, and the locked state thereof, for example. If the vehicle 1 is a hybrid automobile, the vehicle state information acquisition unit 11e may also acquire, as state information, whether the vehicle 1 moves with the power of the engine, or whether the vehicle 1 moves with the power of a motor. It is preferable that the vehicle state information acquisition unit 11e acquires information about the state of the vehicle 1 in which the pattern of data transmission and reception that is performed by the ECUs 2 via the communication lines 1a and 1b in the vehicle 1 may change. The distribution information generation processing unit 11c generate distribution information for each vehicle state acquired by the vehicle state information acquisition unit 11e, and the estimation processing unit 11d performs estimation processing by retrieving the history information 12b according to the vehicle state acquired by the vehicle state information acquisition unit 11e.

The relay processing unit 11f relays data transmission and reception between the communication lines 1a to 1c by transmitting data received by any of the communication lines 1a to 1c, from the other communication lines 1a to 1c. The relay processing unit 11f need not relay all the received data, and determines whether or not the received data needs to be relayed, and decides where to relay the data, for example. The relay processing unit 11f transmits received data to be relayed to the communication lines 1a to 1c connected to a device that needs the data. Note that the communication monitoring processing unit 11b also monitors data that is transmitted and received by the gateway 10.

Figure 3:
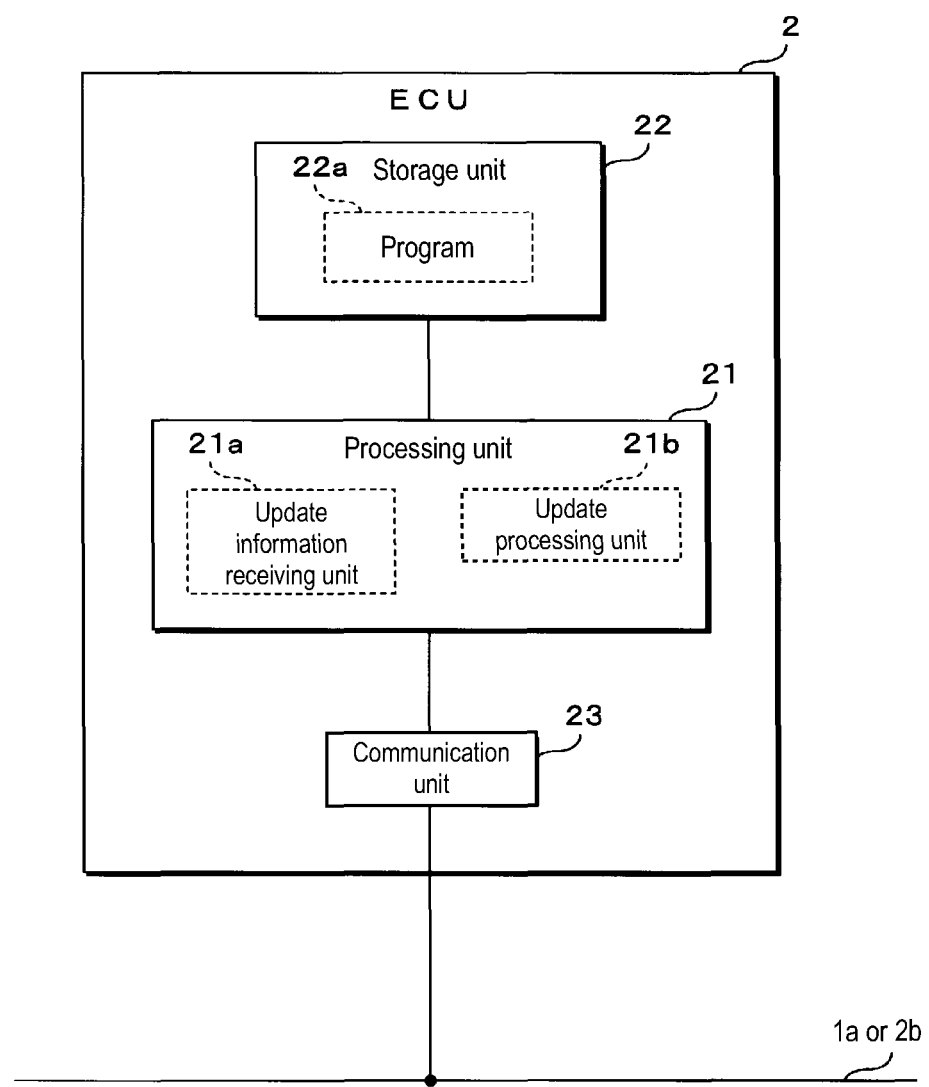
FIG. 3 is a block diagram showing a configuration of an ECU according to this embodiment.

FIG. 3 is a block diagram showing the configuration of the ECU 2 according to this embodiment. Note that FIG. 3 focuses on the functional blocks common to the plurality of ECUs 2, and omits the functional blocks that are different in the ECUs 2. The ECU 2 according to this embodiment includes a processing unit (processor) 21, a storage unit (storage) 22, and a communication unit (transceiver) 23, for example. The processing unit 21 is constituted, for example, by an arithmetic processing unit such as a CPU or an MPU. The processing unit 21 performs various arithmetic operations by retrieving and executing a program 22a stored in the storage unit 22. Note that the content of the program 22a stored in the storage unit 22 changes for each of the ECUs 2.

The storage unit 22 is constituted by a non-volatile memory device such as a flash memory or EEPROM. The storage unit 22 stores not only the program 22a to be executed by the processing unit 21 but also data necessary for execution of the program 22a. Note that the term "program 22a" may encompass the program 22a and the data necessary for execution of the program 22a hereinafter. The earliest program 22a may be written to the storage unit 22 in the step of manufacturing the ECU 2, the ECU 2 may retrieve the program 22a recorded in a recording medium such as a memory card or an optical disk and store the program 22a in the storage unit 22, or a writing device may retrieve the program 22a recorded in a recording medium and write the program 22a to the storage unit 22 of the ECU 2, for example. Note that, in this embodiment, after the ECU 2 is installed in the vehicle 1, the ECU 2 receives the update data from the gateway 10 via the communication lines 1a and 1b, and the ECU 2 updates the program 22a stored in the storage unit 22 using the received update data.

In this embodiment, the storage unit 22 of the ECU 2 is provided with two areas for storing the program 22a. The two areas each have storage capacity sufficient for storing the program 22a. The processing unit 21 performs operation by retrieving the program 22a from one area of the storage unit 22, and the update data received from the gateway 10 is stored in the other area of the storage unit 22. After the ECU 2 has received all the update data from the gateway 10, the ECU 2 updates the program 22a as a result of the processing unit 21 switching an area from which the program 22a is retrieved.

The communication unit 23 is connected with the communication line 1a or 1b that constitutes the in-vehicle network, and transmits and receives data according to, for example, a communication protocol such as CAN. The communication unit 23 transmits data by converting data provided by the processing unit 21 into an electric signal and outputting the electric signal to the communication line 1a or 1b. The communication unit 23 receives data by acquiring an electrical potential at the communication line 1a or 1b by sampling the electrical potential, and provides the thus received data to the processing unit 21.

Also, the processing unit 21 of the ECU 2 according to this embodiment includes an update information receiving unit 21a and an update processing unit 21b. The update information receiving unit 21a and the update processing unit 21b are functional blocks for updating the program 22a stored in the storage unit 22. The update information receiving unit 21a and the update processing unit 21b are software-like functional blocks that are enabled when the processing unit 21 executes a program (illustration omitted) different from the program 22a to be updated. The update information receiving unit 21a receives an update program transmitted via the communication line 1a or 1b via the communication unit 23, and stores the received update program in an unused area of the storage unit 22.

After the update processing unit 21b has stored all the update data in an unused area of the storage unit 22, the update processing unit 21b switches the area of the storage unit 22 where the processing unit 21 executes the program 22a from the area in which the program 22a that is currently being executed is stored to an area in which the update data is stored. Accordingly, the processing unit 21 retrieves, from the storage unit 22, a new program 22a acquired from the gateway 10 as update data and executes the program 22a, and thus an update of the program 22a is complete. After an update is complete, the ECU 2 may also delete data from the area of the storage unit 22 in which the previous program 22a is stored.

Generation of Probability Distribution and Estimation of Unused Time Period

Figure 4:
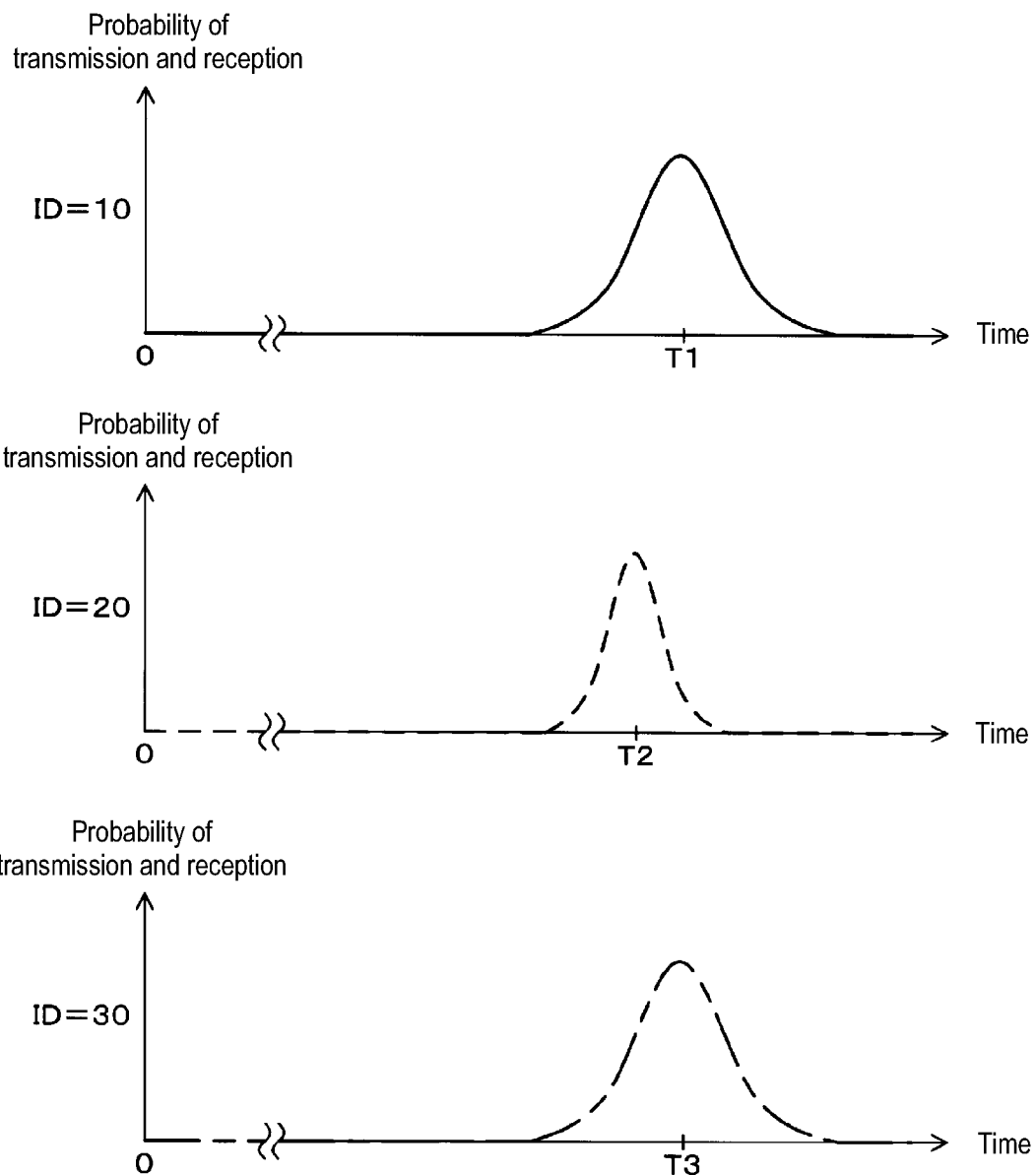
FIG. 4 is a schematic diagram showing an example of information about a probability distribution generated by a distribution information generation processing unit of a gateway.

FIG. 4 is a schematic diagram showing an example of information about a probability distribution generated by the distribution information generation processing unit 11c of the gateway 10. It is presumed that three types of data with CAN ID 10, 20, and 30 are transmitted and received on the communication line 1a, for example. If data is transmitted to the communication line 1a, the communication monitoring processing unit 11b of the gateway 10 acquires the ID of the data, and a transmission start timing and a transmission end timing (or transmission time). The distribution information generation processing unit 11c uses, as a reference, the transmission start timing of previous data transmission and reception for data with ID 10, for example, and sets, as data transmission time, the time taken from the transmission start timing of the current data transmission and reception to the transmission end timing. The distribution information generation processing unit 11c repeatedly acquires information about the data transmission time for data with ID 10, and calculates (the number of instances of data transmission and reception)/(the number of instances of transmission and reception of all the data) at each time. Accordingly, the distribution information generation processing unit 11c can generate distribution information where the horizontal axis indicates the time and the vertical axis indicates the probability that data is transmitted and received.

The top in FIG. 4 shows an example of a probability distribution of transmission and reception of data with ID 10. If data with ID 10 is repeatedly transmitted in a cycle T1, for example, the probability distribution of the data transmission and reception may be a normal distribution or a distribution that is close to a normal distribution with a point of time when time T1 has passed since the previous data transmission being the center (average). In a similar manner, the distribution information generation processing unit 11c generates probability distributions for data with ID 20 and ID 30. An example of the probability distribution for data with ID 20 transmitted in a cycle T2 is shown in the middle in FIG. 4. An example of the probability distribution for data with ID 30 transmitted in a cycle T3 is shown in the bottom in FIG. 4.

Also, the distribution information generation processing unit 11c generates information about a probability distribution for each state of the vehicle 1 (IG signal is ON or OFF) acquired by the vehicle state information acquisition unit 11e, for each of the communication lines 1a and 1b connected to the ECUs 2, and for each ID included in data. The distribution information generation processing unit 11c stores the generated information about the probability distribution in the storage unit 12 as the history information 12b.

Also, the communication monitoring processing unit 11b acquires information about data transmission start timing and transmission end timing, every time data is transmitted and received to/from the communication lines 1a and 1b, for example. Every time the communication monitoring processing unit 11b acquires information, the distribution information generation processing unit 11c generates information about a probability distribution corresponding to the acquired information, and updates the information about the probability distribution stored in the storage unit 12 as the history information 12b.

Figure 5:
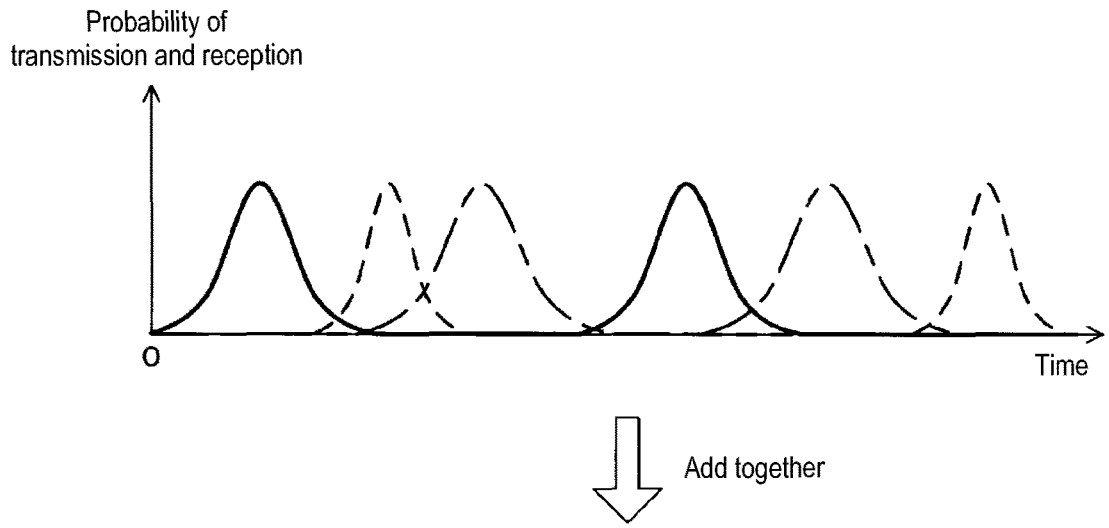
FIG. 5 is a schematic diagram illustrating unused time period estimation processing performed by an estimation processing unit of the gateway.
Figure 5:
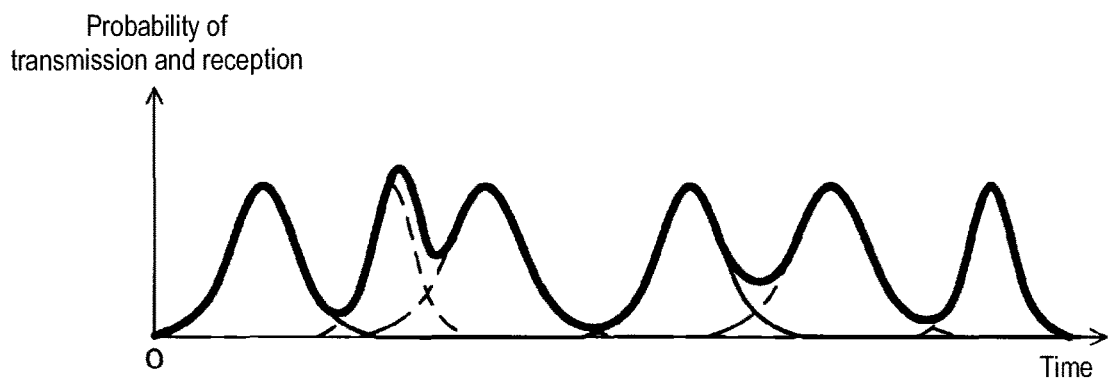
Figure 6:
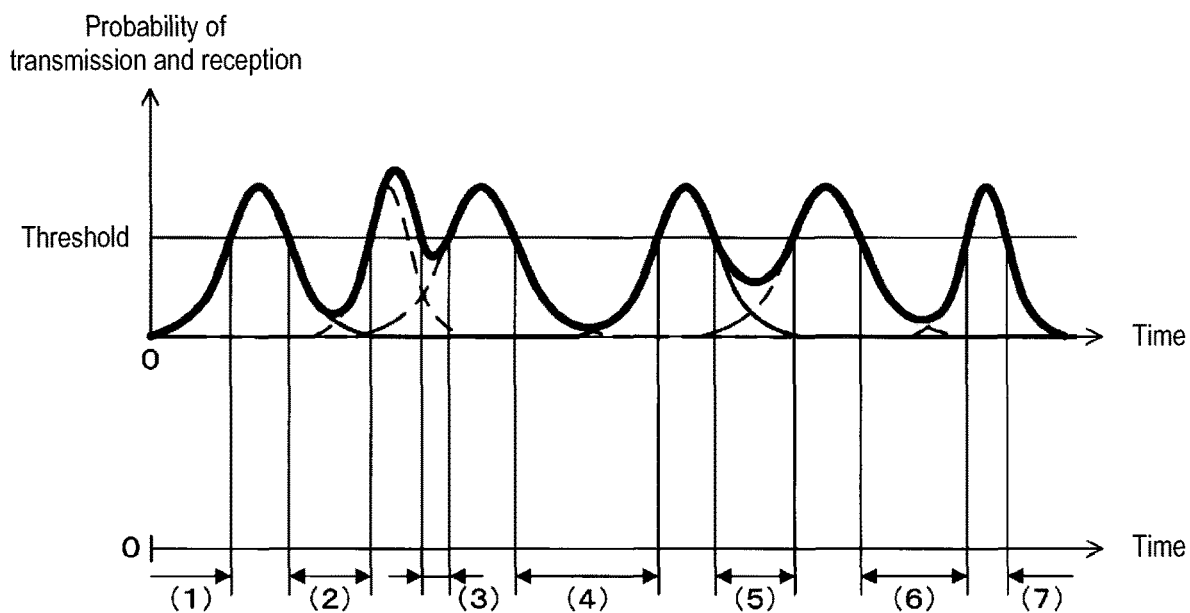
FIG. 6 is a schematic diagram illustrating unused time period estimation processing performed by the estimation processing unit of the gateway.

FIGS. 5 and 6 are schematic diagrams illustrating unused time period estimation processing performed by the estimation processing unit 11d of the gateway 10. If the program 22a of an ECU 2 needs updating, the estimation processing unit 11d of the gateway 10 retrieves, from the history information 12b in the storage unit 12, information about a probability distribution for data that is transmitted and received via the communication lines 1a and 1b connected to the ECU 2 to be updated. At this time, the estimation processing unit 11d retrieves, from the storage unit 12, information corresponding to the vehicle state acquired by the vehicle state information acquisition unit 11e.

Then, by combining information about one or more retrieved probability distributions, the estimation processing unit 11d generates a probability distribution of transmission and reception of data with all the IDs that may be transmitted and received via the communication lines 1a and 1b on which data is to be transmitted and received. The top in FIG. 5 shows superimposition of information about probability distributions for three data sets with ID 10, ID 20, and ID 30 shown in FIG. 4. If probability distributions overlap each other with regard to the transmission and reception of data with different IDs, the estimation processing unit 11d combines probability distributions of data with all the IDs by adding together the probabilities regarding this overlapping portions. The combined probability distribution is shown with a thick line in the bottom in FIG. 5.

Then, the estimation processing unit 11d estimates, as an unused time period in which the communication lines 1a and 1b to/from where data is to be transmitted and received are not used, a time period in which the probability is equal to or less than a predetermined threshold with respect to the combined probability distribution. The threshold for the combined probability distribution is indicated by a horizontal line in the top in FIG. 6. At this time, the threshold used by the estimation processing unit 11d may be predetermined in the step of designing the vehicle 1 or the like, and may be stored in the storage unit 12 of the gateway 10 or the like. Also, the threshold may be increased or reduced according to the state of the vehicle 1, the communication states of the communication lines 1a and 1b, the importance of update data, or the like. Seven time periods (1) to (7) estimated by the estimation processing unit 11d as unused time periods are shown in the bottom in FIG. 6. Note that, if the duration of a time period is shorter than that of a predetermined time period as the unused time period (3) shown in FIG. 6, for example, the estimation processing unit 11d may exclude such a time period from the unused time periods.

Figure 7:
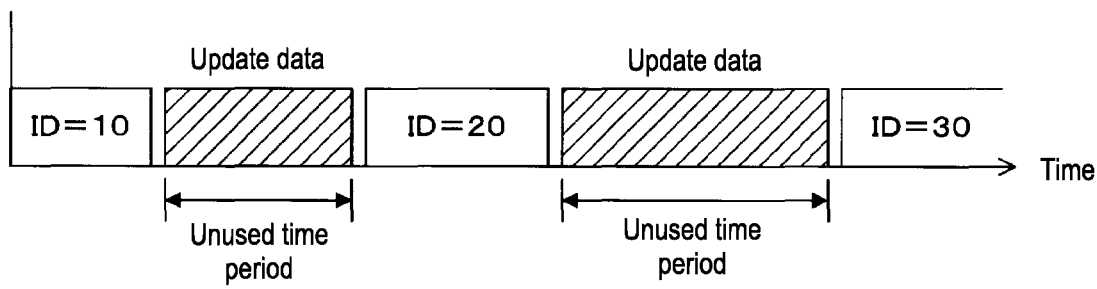
FIG. 7 is a schematic diagram showing an example of transmission of update data.

FIG. 7 is a schematic diagram showing an example of transmission of update data. The update processing unit 11a of the gateway 10 transmits update data in the time period determined by the estimation processing unit 11d as the unused time period. Accordingly, the gateway 10 can transmit update data without inhibiting normal data transmission and reception, using the unused time periods in which no ECUs 2 perform normal data transmission and reception via the communication lines 1a and 1b.

Flowchart

Figure 8:
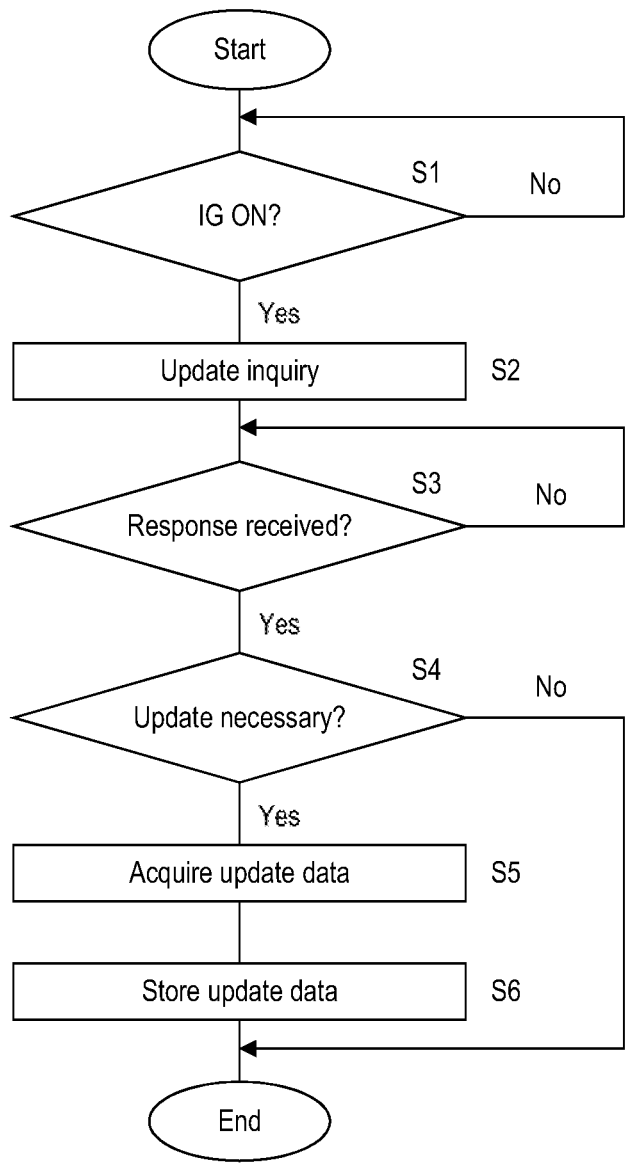
FIG. 8 is a flowchart of an update data acquisition process, showing process steps performed by the gateway according to this embodiment.

FIG. 8 is a flowchart of an update data acquisition process, showing process steps performed by the gateway 10 according to this embodiment. Note that, although a configuration is adopted in this example in which, if the IG switch 4 of the vehicle 1 is changed from OFF to ON, the gateway 10 queries the server device 9 whether or not programs or data of the ECUs 2 need updating, this configuration is an example, and an inquiry as to whether or not an update is necessary may be made at the other various timings. In the gateway 10 according to this embodiment, the update processing unit 11a of the processing unit 11 determines whether or not the IG switch 4 of the vehicle 1 is changed from OFF to ON, based on the state of the IG signal acquired by the vehicle state information acquisition unit 11e (step S1). If the IG switch 4 is not changed from OFF to ON (NO in step S1), that is, if the IG switch 4 is kept OFF, the update processing unit 11a waits until the IG switch 4 is changed from OFF to ON.

If the IG switch 4 is changed from OFF to ON (YES in step S1), then the update processing unit 11a queries, using the wireless communication device 3, the server device 9 whether or not programs or data stored in the ECUs 2 installed in the vehicle 1 need updating (step S2). The update processing unit 11a determines whether or not the response to this update inquiry has been received from the server device 9 via the wireless communication device 3 (step S3). If no update command has been received from the server device 9 (NO in step S3), the update processing unit 11a waits until the response is received. Note that, if no response is obtained even if the update processing unit 11a waits for a predetermined time, for example, the update processing unit 11a may interrupt the process.

If the response has been received from the server device 9 (YES in step S3), the update processing unit 11a determines whether or not programs or data in the ECUs 2 need updating, based on the content of the received response (step S4). If no update is necessary (NO in step S4), then the update processing unit 11a ends processing. If an update is necessary (YES in step S4), then the update processing unit 11a communicates with the server device 9 using the wireless communication device 3, and acquires update data from the server device 9 (step S5). The update processing unit 11a stores update data acquired from the server device 9 in the storage unit 12 (step S6), and ends processing.

Figure 9:
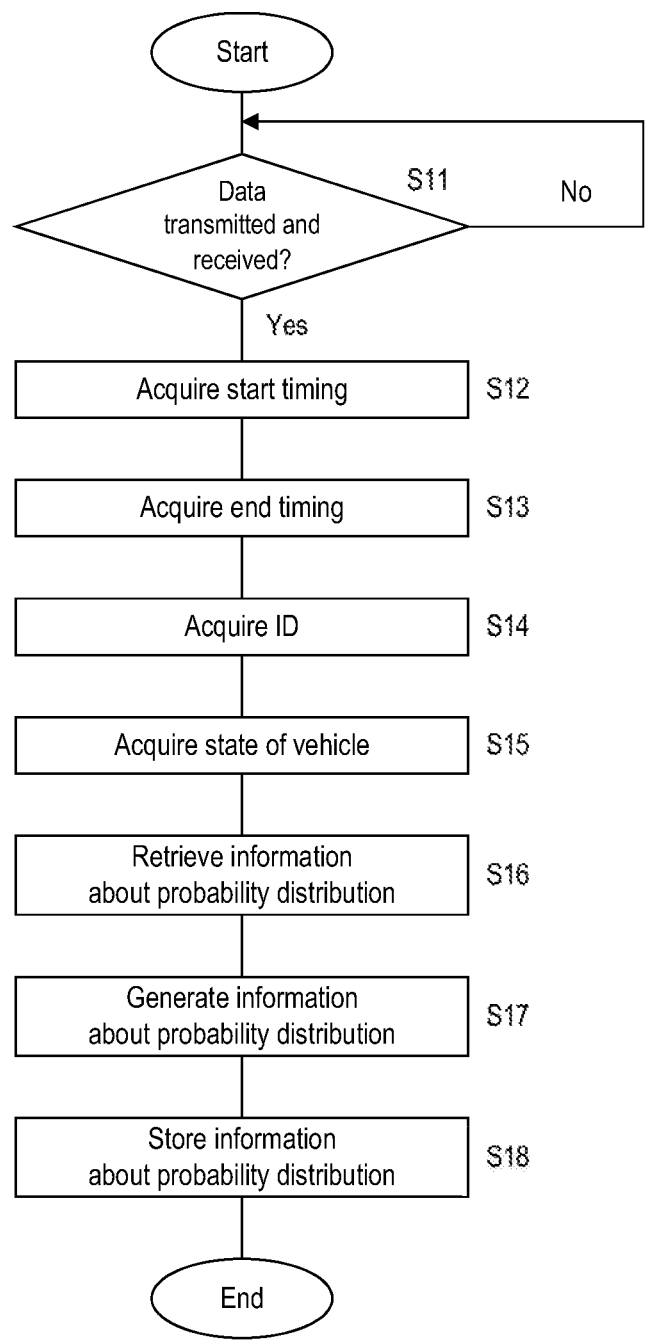
FIG. 9 is a flowchart of an in-vehicle communication monitoring process, showing process steps performed by the gateway according to this embodiment.

FIG. 9 is a flowchart of an in-vehicle communication monitoring process, showing process steps performed by the gateway 10 according to this embodiment. In the gateway 10 according to this embodiment, the communication monitoring processing unit 11b of the processing unit 11 determines whether or not data is transmitted and received to/from the communication lines 1a and 1b connected to the ECUs 2 that can be updated (step S11). If no data is transmitted or received to/from the communication lines 1a and 1b (NO in step S11), then the communication monitoring processing unit 11b waits until data is transmitted and received to/from the communication lines 1a and 1b.

If data is transmitted and received to/from the communication lines 1a and 1b (YES in step S11), then the communication monitoring processing unit 11b acquires a transmission start timing (step S12) and acquires a transmission end timing (step S13) for data to be transmitted and received, and acquires an ID assigned to this data (step S14). Also, the vehicle state information acquisition unit 11e of the processing unit 11 acquires the state of the vehicle 1 at this time (step S15). The start timing acquired in step S12, the end timing acquired in step S13, the ID of data acquired in step S14, and vehicle information acquired in step S15 are provided to the distribution information generation processing unit 11c of the processing unit 11.

The distribution information generation processing unit 11c retrieves information about the probability distribution stored in the storage unit 12 as the history information 12b (step S16). At this time, the distribution information generation processing unit 11c retrieves the vehicle information acquired in step S15, the ID acquired in step S14, and information about the probability distributions associated with the communication lines 1a and 1b via which data is transmitted and received. The distribution information generation processing unit 11c generates information about a new probability distribution by reflecting in the probability distribution that data is transmitted and received from the start timing acquired in step S12 to the end timing acquired in step S13, based on the retrieved information about the probability distributions (step S17). The distribution information generation processing unit 11c stores the generated information about the probability distribution in the storage unit 12 as the history information 12b (step S18), and ends processing.

Figure 10:
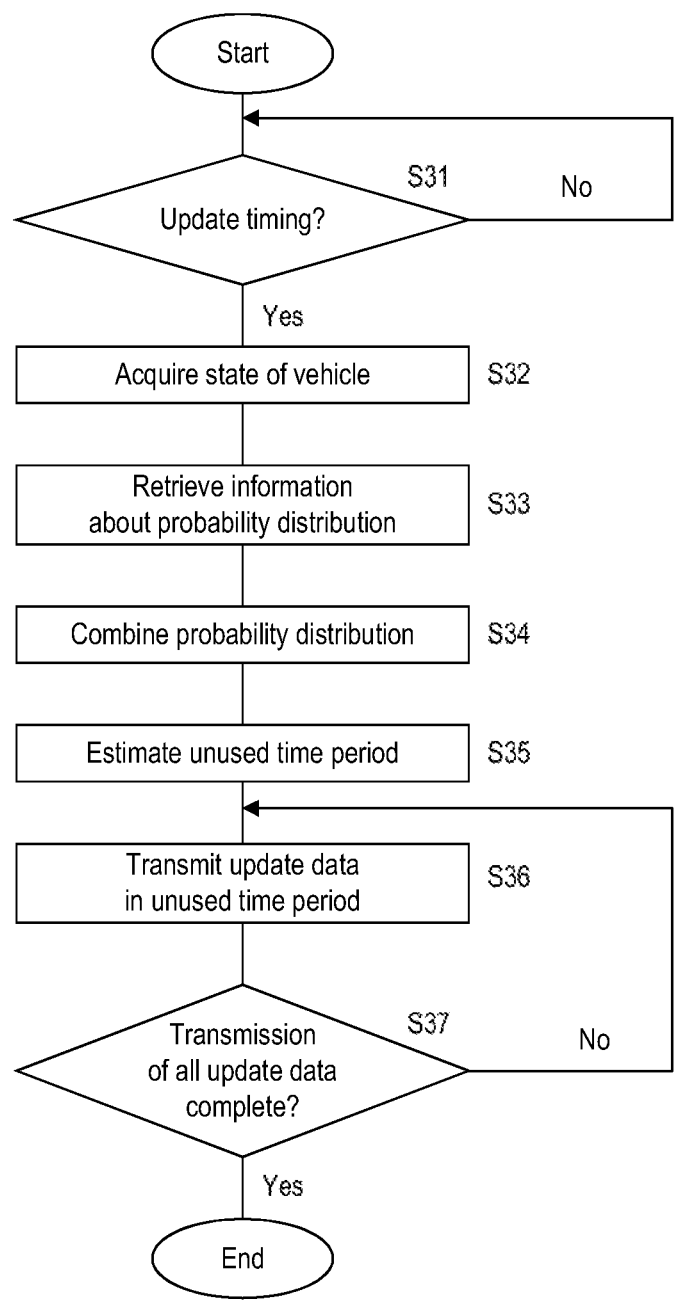
FIG. 10 is a flowchart of an update process, showing process steps performed by the gateway according to this embodiment.

FIG. 10 is a flowchart of an update process, showing process steps performed by the gateway 10 according to this embodiment. In the gateway 10 according to this embodiment, the update processing unit 11a of the processing unit 11 determines whether it is the timing to update programs or data stored in the ECUs 2, based on whether or not a predetermined condition is met, such as the acquisition of update data being complete, for example (step S31). If the timing of an update has not come (NO in step S31), the update processing unit 11a waits until the update timing comes (step S31).

If the update timing has come (YES in step S31), the vehicle state information acquisition unit 11e of the processing unit 11 acquires information about the state of the vehicle 1 (step S32). Then, the estimation processing unit 11d of the processing unit 11 retrieves the information about the probability distribution stored in the storage unit 12 as the history information 12b (step S33). At this time, the estimation processing unit 11d retrieves the vehicle information acquired in step S32 and the information about the probability distributions for all the IDs associated with the communication lines 1a and 1b connected to the ECUs 2 to be updated. By combining the retrieved information about the probability distributions for all the IDs (step S34), the estimation processing unit 11d obtains the distribution of the probability that data is transmitted and received on the communication lines 1a and 1b connected to the ECUs 2 to be updated. The estimation processing unit 11d estimates the unused time periods of the communication lines 1a and 1b connected to the ECUs 2 to be updated by comparing the probability distribution obtained in step S34 with the predetermined threshold (step S35). At this time, the estimation processing unit 11d estimates, as an unused time period, a time period in which the probability that data is transmitted and received is less than a threshold.

The update processing unit 11a outputs, to the communication lines 1a and 1b, update data (transmission data obtained by splitting update data) in the unused time period estimated by the estimation processing unit 11d, and transmits update data to the ECUs 2 to be updated, using the unused time periods in which no communication lines 1a and 1b are used (step S36). The update processing unit 11a determines whether or not the transmission of all the update data to be transmitted to the ECUs 2 to be updated is complete (step S37). If the transmission of all the update data is not complete (NO in step S37), then the update processing unit 11a returns processing to step S36, and continues the transmission of the update data. If the transmission of all the update data is complete (YES in step S37), then the update processing unit 11a ends the update processes.

Figure 11:
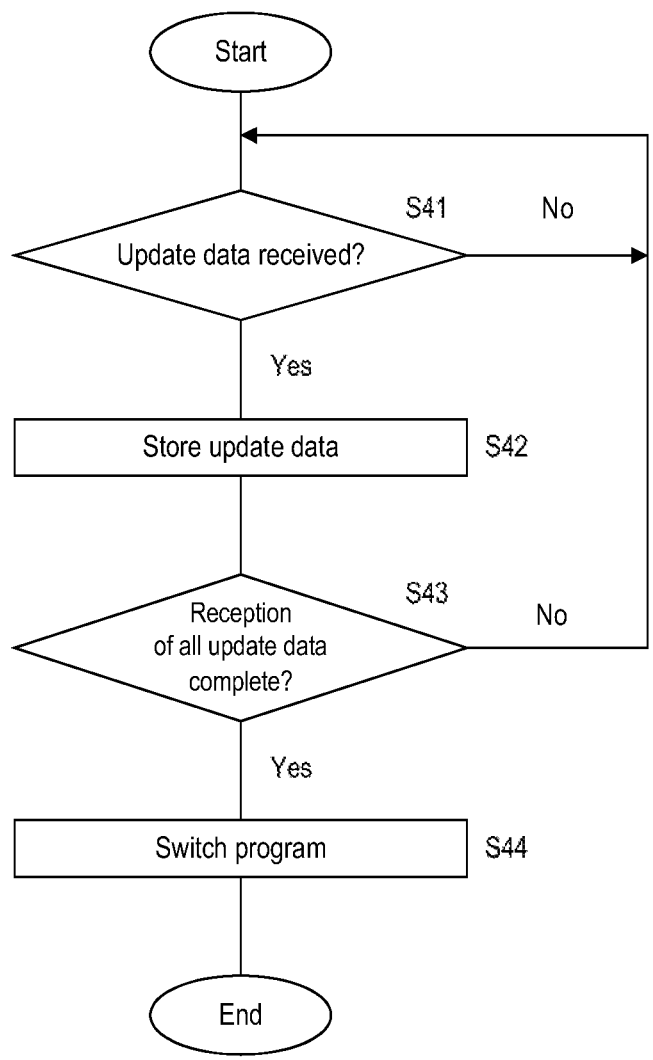
FIG. 11 is a flowchart of an update process, showing process steps performed by an ECU according to this embodiment.

FIG. 11 is a flowchart of an update process, showing process steps performed by the ECUs 2 according to this embodiment. The update information receiving unit 21a of the processing unit 21 in the ECU 2 according to this embodiment determines whether or not update data has been received from the gateway 10 via the communication unit 23 (step S41). If no update data has been received (NO in step S41), the update information receiving unit 21a waits until the update information receiving unit 21a receives update data.

If update data has been received from the gateway 10 (YES in step S41), the update information receiving unit 21a stores the received update data in the storage unit 22 (step S42). At this time, the update information receiving unit 21a stores the received update data in an area that is different from the area in which the program 22a is stored which is stored in the storage unit 22 and is executed by the processing unit 21. The update information receiving unit 21a determines whether or not the reception of all the update data necessary for an update process is complete (step S43). If the reception of all the update data is not complete (NO in step S43), then the update information receiving unit 21a returns processing to step S41, and continues the reception of the update data.

If the reception of all the update data is complete (YES in step S43), then the update processing unit 21b of the processing unit 21 switches the program 22a executed by the processing unit 21 (step S44). At this time, the update processing unit 21b switches the program 22a executed by the processing unit 21 by switching the area of the storage unit 22 from which the processing unit 21 retrieves the program 22a, from the area in which the previous program 22a is stored to an area in which the update data is stored. After the program 22a is switched, the processing unit 21 ends the update process.

SUMMARY

In the on-board update system 100 having the above-described configuration according to this embodiment, the gateway 10 installed in the vehicle 1 updates the programs 22a stored in the storage units 22 of the ECUs 2 by transmitting update data to the ECUs 2 via the communication lines 1a and 1b provided in the vehicle 1. The gateway 10 monitors data that is transmitted and received via the communication lines 1a and 1b connected to the ECUs 2, and stores history information 12b regarding the timing of transmission and reception of data that is to be transmitted and received via the communication lines 1a and 1b. If the ECUs 2 are updated, the gateway 10 estimates an unused time period in which no data is transmitted or received via the communication lines 1a and 1b, based on the history information 12b stored with regard to the communication lines 1a and 1b connected to the ECUs 2 to be updated, and transmits update data in the estimated unused time period. Accordingly, the gateway 10 can transmit update data using the time period in which no normal communication is performed via the communication lines 1a and 1b. Thus, it is possible to prevent the transmission of update data from inhibiting normal communication, and also to shorten the time taken to complete the transmission of update data due to a time period in which the communication lines 1a and 1b are not used being effectively utilized.

Also, the gateway 10 generates information about a probability distribution of the timing when data is transmitted and received to/from the communication lines 1a and 1b, based on the timing when data has been actually transmitted and received to/from the communication lines 1a and 1b, and stores the generated information about the probability distribution in the storage unit 12 as the history information 12b. Accordingly, the gateway 10 can accurately find out, based on the probability distribution, the usage statuses of the communication lines 1a and 1b in normal communication.

Also, the gateway 10 generates information about a probability distribution for each ID included in data that is transmitted and received, and stores the information as the history information 12b. Accordingly, the gateway 10 can store information in which the spread of the probability distribution regarding data and the like that is transmitted in a fixed cycle is reduced, and can more accurately find out the usage statuses of the communication lines 1a and 1b.

Also, based on information about the probability distributions stored as the history information 12b, the gateway 10 estimates, as the unused time period in which the communication lines 1a and 1b are not used, a time slot in which the probability that data is transmitted and received to/from the communication lines 1a and 1b is lower than a predetermined reference (threshold). Accordingly, the gateway 10 can transmit update data at the timing when the communication lines 1a and 1b are unlikely to be used, using information about the probability distributions stored as the history information 12b.

Also, the gateway 10 acquires the state of the vehicle 1, such as the ON and OFF states of the IG switch 4, for example, and stores, as the history information 12b, information about a probability distribution for each state of the vehicle 1. Although, if the state of the vehicle 1 changes, the frequency and timing when the ECUs 2 transmit and receive data may change, for example, as a result of the gateway 10 storing the history information 12b for each state of the vehicle 1, it is possible to estimate an unused time period suitable for the state of the vehicle.

Note that, although it is presumed that devices whose programs or data is to be updated are the ECUs 2 in the on-board update system 100 according to this embodiment, there is no limitation thereto, and a configuration may also be adopted in which programs or data regarding various on-board devices other than the ECUs 2 are updated. Also, although it is presumed that in the on-board update system 100, a device for updating the ECUs 2 is the gateway 10, there is no limitation thereto, and one of the ECUs 2 may be configured to acquire and transmit data for updating the other ECUs 2, or various devices other than the gateway 10 and the ECUs 2 may be configured to perform an update process, for example. Also, although the gateway 10 is configured to communicate with the server device 9 using the wireless communication device 3, there is no limitation thereto, and a configuration may also be adopted in which the gateway 10 has the function of wireless communication. Also, the probability distributions, threshold, unused time periods, and the like shown in FIGS. 4 to 7 are examples, and there is no limitation thereto.

Variations

Also, the gateway 10 may not only transmit update data corresponding to the results of estimation of the unused time periods based on the history information 12b stored in the storage unit 12, but also transmit update data taking the other conditions into consideration. There are cases where, in the step of designing the vehicle 1, it is known that there is a data non-transmission time period with a predetermined duration after data with a specific ID is transmitted, for example. In such a case, the gateway 10 can store the ID of this data and the duration of the data non-transmission time period thereafter, as exceptional conditions, in advance. The gateway 10 can retrieve the exceptional conditions when estimating unused time periods, and determine a time period corresponding to these conditions as the unused time periods of the communication lines 1a and 1b, regardless of the probability distributions.

Embodiment 2

In order for the gateway 10 to accurately perform an estimation process in the on-board update system 100, information regarding the transmission and reception of data via the communication lines 1a and 1b needs to be stored to some extent. Thus, there is a concern that the accuracy in the estimation process performed by the gateway 10 may be low before sufficient information is stored, such as the vehicle 1 immediately after the vehicle 1 is manufactured, or the vehicle 1 immediately after the vehicle 1 is sold, for example. In view of this, in the on-board update system 100 according to Embodiment 2, the server device 9 delivers, to the gateway 10, initial information of the history information 12b used by the gateway 10 to estimate the unused time periods of the communication lines 1a and 1b. Initial information delivered by the server device 9 may be pre-generated based on the results of simulation and the like in the step of designing the vehicle 1, for example, may be history information that is stored in the other vehicle 1 and is acquired by the server device 9, for example, or may be generated or acquired using the other methods. The gateway 10 that has received initial information from the server device 9 stores the received initial information in the storage unit 12 as the history information 12b, and performs processes such as the generation of information about a probability distribution and the estimation of unused time periods based on this initial information.

Also, in the on-board update system 100 according to Embodiment 2, the history information 12b generated by the gateway 10 is periodically transmitted to the server device 9. The server device 9 that has received the history information 12b from a plurality of the vehicles 1 can generate more accurate history information 12b by combining a lot of history information 12b. The server device 9 can deliver the generated history information 12b to the vehicle 1 as the above-described initial information.

Figure 12:
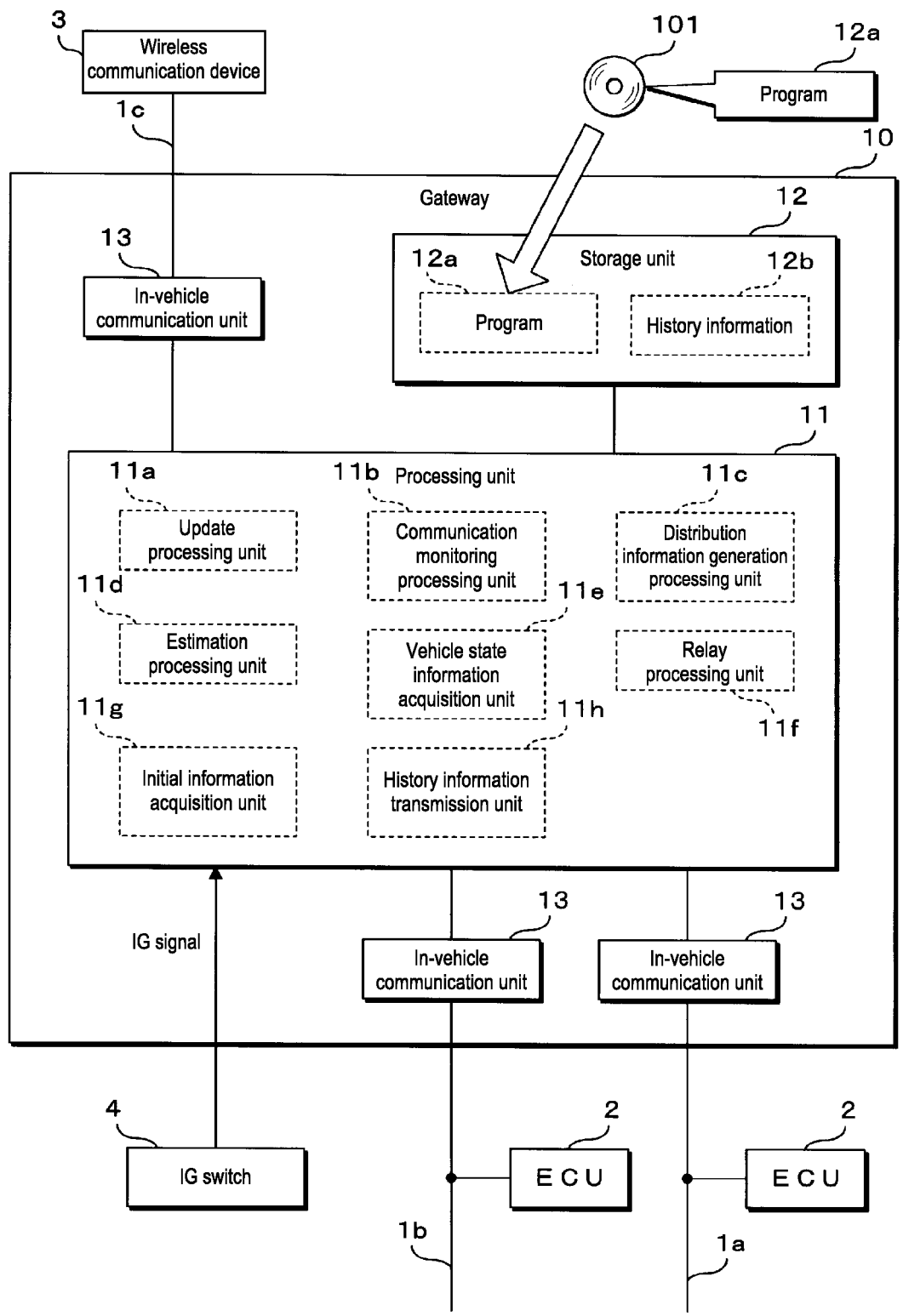
FIG. 12 is a block diagram showing a configuration of a gateway according to Embodiment 2.

FIG. 12 is a block diagram showing the configuration of the gateway 10 according to Embodiment 2. The gateway 10 according to Embodiment 2 is based on the gateway 10 according to Embodiment 1 shown in FIG. 2, and is further provided with, as software-like functional blocks, an initial information acquisition unit 11g and a history information transmission unit 11h in the processing unit 11. After the gateway 10 is activated, the initial information acquisition unit 11g checks whether the history information 12b is stored in the storage unit 12. If no history information 12b is stored therein, the initial information acquisition unit 11g communicates with the server device 9 using the wireless communication device 3, and acquires the initial information of the history information 12b from the server device 9.

The history information transmission unit 11h periodically transmits the history information 12b stored in the storage unit 12 to the server device 9. The history information transmission unit 11h may transmit the history information 12b to the server device 9 every time the IG switch 4 of the vehicle 1 is changed from OFF to ON, for example. Also, the history information transmission unit 11h may transmit the history information 12b to the server device 9 in a predetermined cycle such as once a day, once a week, or once a month, for example. The timing when the history information transmission unit 11h transmits the history information 12b to the server device 9 may be any timing.

The history information 12b can be used only by the vehicles 1 having the same hardware configuration. The history information transmission unit 11h transmits system configuration information of the vehicle 1 to the server device 9 together with the history information 12b. System configuration information includes information about the hardware configuration such as the number and types of ECUs 2 connected to the communication lines 1a and 1b in which the history information 12b is transmitted, and information about the software configuration such as the versions of the programs 22a that are being executed by the ECUs 2. Also, similarly to the case where initial information is acquired, the initial information acquisition unit 11g transmits system configuration information to the server device 9, and the server device 9 transmits initial information suitable for system configuration information to the vehicle 1.

Figure 13:
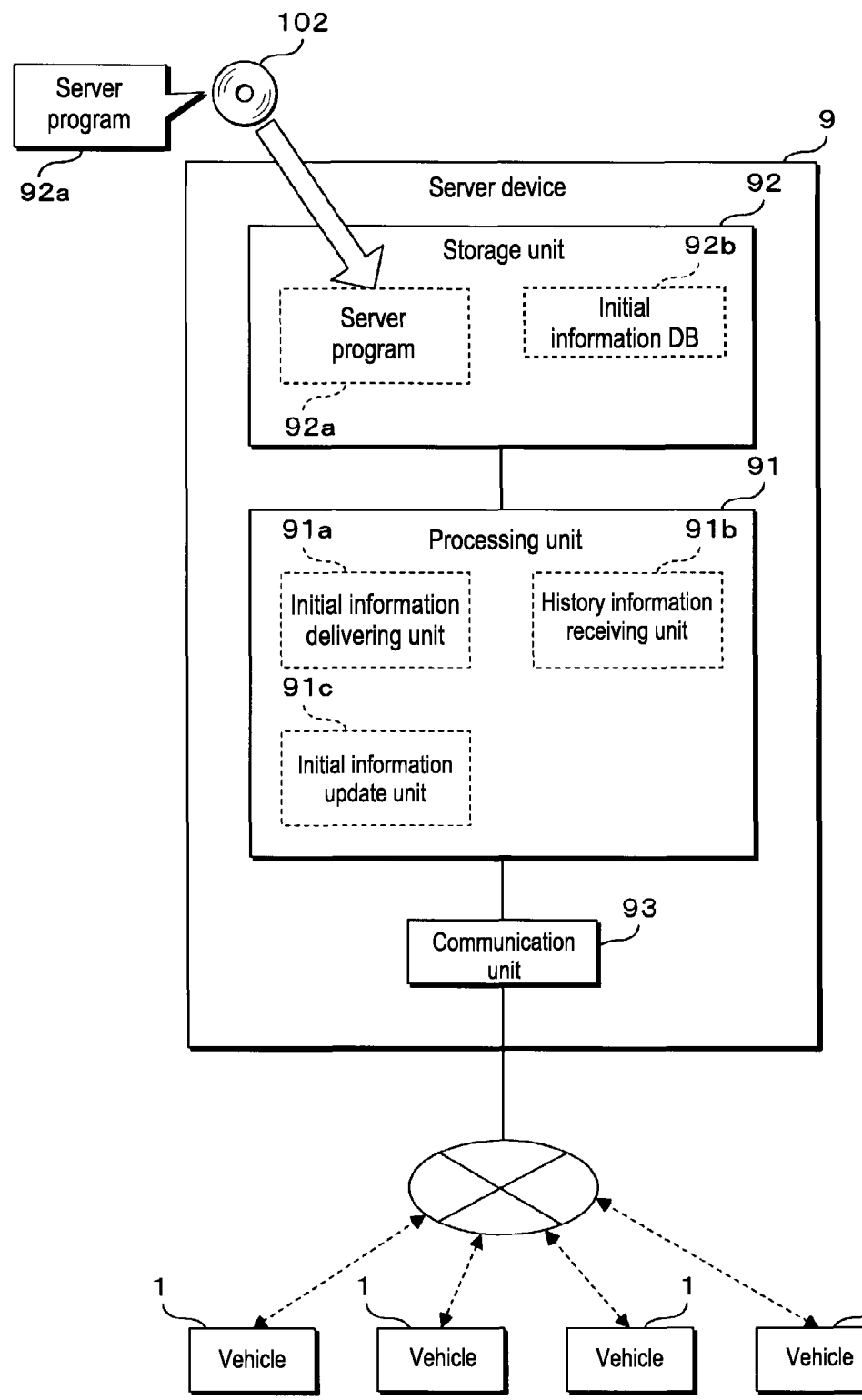
FIG. 13 is a block diagram showing a configuration of a server device according to Embodiment 2.

FIG. 13 is a block diagram showing the configuration of the server device 9 according to Embodiment 2. The server device 9 according to Embodiment 2 includes a processing unit (processor) 91, a storage unit (storage) 92, a communication unit (transceiver) 93, and the like. The processing unit 91 is constituted by an arithmetic processing unit such as a CPU or an MPU. The processing unit 91 performs various arithmetic operations by retrieving and executing a server program 92a stored in the storage unit 92. In this embodiment, the processing unit 91 delivers initial information of the history information 12b to the vehicle 1, and receives history information transmitted from the vehicle 1 and updates initial information, for example. Note that functional blocks regarding processing for issuing a response to an inquiry regarding whether or not the ECUs 2 need updating from the vehicle 1, processing for delivering update data to the vehicle 1, and the like are not shown. The server device 9 for delivering initial information and the server device 9 for delivering update data are not necessarily a single device, and these processes may be distributed to and executed by different server devices 9.

The storage unit 92 is constituted by a large-capacity storage device such as a hard disk drive. The storage unit 92 stores various programs executed by the processing unit 91, and various data necessary for processing performed by the processing unit 91. In Embodiment 2, the storage unit 92 stores the server program 92a executed by the processing unit 91, and is provided with an initial information DB (database) 92b in which data necessary for the execution of this server program 92a is stored. Note that the server device 9 may retrieve the server program 92a recorded in a recording medium 102 such as a memory card or an optical disk and store the server program 92a in the storage unit 92, or the server device 9 may acquire the server program 92a delivered by another server device, through communication, for example. The server program 92a may also be delivered via a network, or may be recorded in the recording medium 102 and provided. Initial information to be delivered to the vehicle 1 is stored in the initial information DB 92b in association with the system configuration information about the vehicle 1.

The communication unit 93 communicates with the wireless communication device 3 installed in the vehicle 1 via a network such as the Internet, a wireless LAN, or a mobile telephone communication network. The communication unit 93 transmits data provided by the processing unit 91 to the vehicle 1, and provides the data received from the vehicle 1 to the processing unit 91.

Also, the processing unit 91 executes the server program 92a stored in the storage unit 92, and thereby enables software-like functional blocks such as an initial information delivering unit 91a, a history information receiving unit 91b, and initial information update unit 91c. If an initial information acquisition request is received from the vehicle 1, the initial information delivering unit 91a retrieves, from the initial information DB 92b of the storage unit 92, initial information suitable for the system configuration information of the vehicle 1 to be provided together with this request, and transmits the retrieved initial information to the vehicle 1 that has made the request.

The history information receiving unit 91b receives the history information 12b that is periodically transmitted by the vehicle 1, via the communication unit 93, and provides the received history information 12b to the initial information update unit 91c. At this time, the history information receiving unit 91b receives system configuration information transmitted by the vehicle 1 together with the history information 12b, and provides the system configuration information to the initial information update unit 91c together with the history information 12b.

The initial information update unit 91c updates initial information stored in the initial information DB 92b based on the history information 12b received from the vehicle 1. The initial information update unit 91c retrieves the corresponding initial information from the initial information DB 92b based on the system configuration information received together with the history information 12b. The initial information update unit 91c generates information about a new probability distribution by combining the probability distribution for the retrieved initial information and the probability distribution for the received history information 12b, and stores the generated probability distribution as new initial information in the initial information DB 92b, and thereby updates the initial information.

Figure 14:
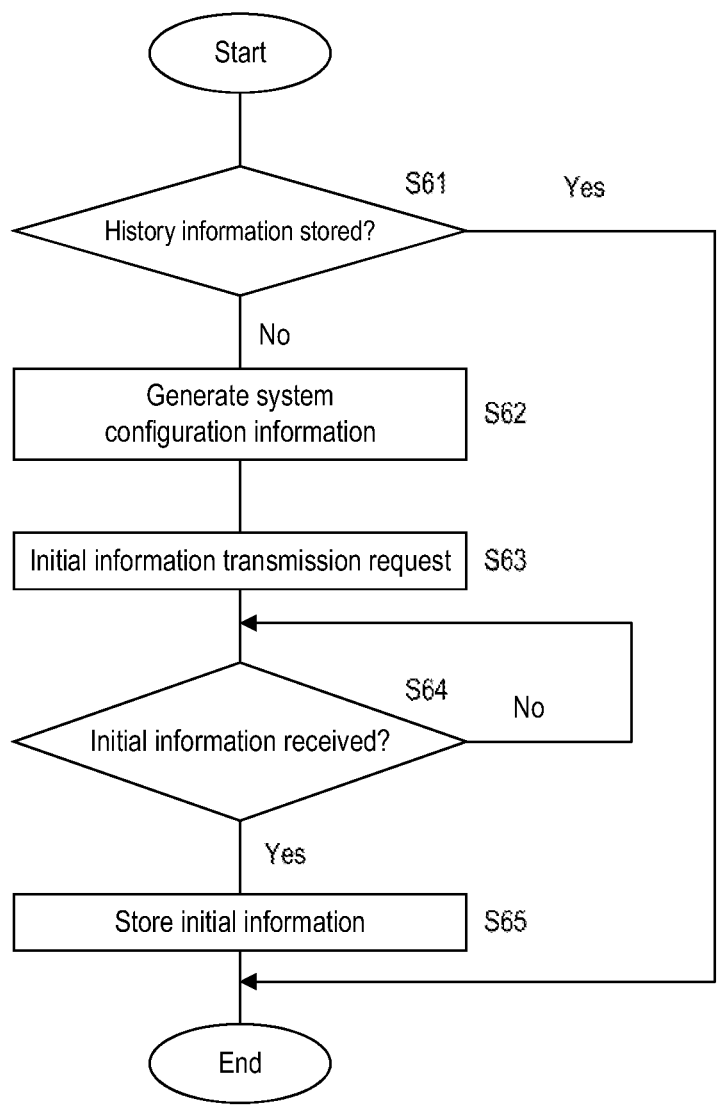
FIG. 14 is a flowchart of an initial information acquisition process, showing process steps performed by the gateway according to Embodiment 2.

FIG. 14 is a flowchart of an initial information acquisition process, showing process steps performed by the gateway 10 according to Embodiment 2. In the gateway 10 according to Embodiment 2, after the gateway 10 is activated, the initial information acquisition unit 11g of the processing unit 11 determines whether or not history information 12b is stored in the storage unit 12 (step S61). If the history information 12b is stored (YES in step S61), then the initial information acquisition unit 11g ends processing without acquiring initial information.

If no history information 12b is stored in the storage unit 12 (NO in step S61), then the initial information acquisition unit 11g collects information about the types of ECUs 2 connected to the communication lines 1a and 1b and the versions of the programs 22a, and generates system configuration information (step S62). The initial information acquisition unit 11g transmits an initial information transmission request to the server device 9 using the wireless communication device 3, together with the generated system configuration information (step S63).

The initial information acquisition unit 11g determines whether or not initial information transmitted from the server device 9 has been received as the response to the transmission request (step S64). If no initial information has been received (NO in step S64), then the initial information acquisition unit 11g waits until the initial information acquisition unit 11g receives initial information from the server device 9. If initial information has been received (YES in step S64), then the initial information acquisition unit 11g stores the received initial information in the storage unit 12 as the history information 12b (step S65), and ends processing.

Figure 15:
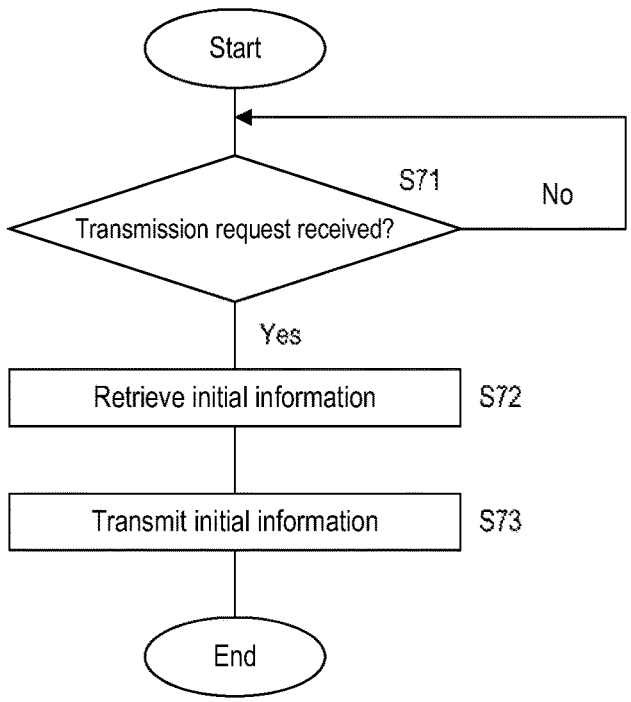
FIG. 15 is a flowchart of an initial information delivering process, showing process steps performed by the server device according to Embodiment 2.

FIG. 15 is a flowchart of an initial information delivering process, showing process steps performed by the server device 9 according to Embodiment 2. In the server device 9 according to Embodiment 2, the initial information delivering unit 91a of the processing unit 91 determines whether or not an initial information transmission request has been received from the gateway 10 of the vehicle 1 (step S71). If no initial information transmission request has been received (NO in step S71), then the initial information delivering unit 91a waits until the initial information delivering unit 91a receives a transmission request.

If an initial information transmission request has been received (YES in S71), then the initial information delivering unit 91a retrieves, from the initial information DB 92b of the storage unit 92, initial information corresponding to the system configuration information received together with the transmission request (step S72). The initial information delivering unit 91a transmits the retrieved initial information to the vehicle 1 that has made the request (step S73), and ends processing.

Figure 16:
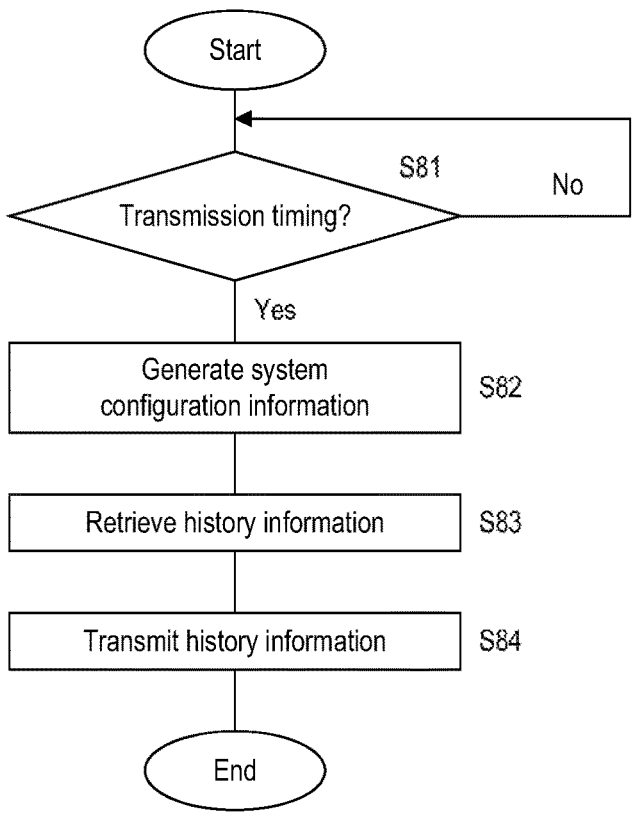
FIG. 16 is a flowchart of a history information transmission process, showing process steps performed by the gateway according to Embodiment 2.

FIG. 16 is a flowchart of a history information transmission process, showing process steps performed by the gateway 10 according to Embodiment 2. In the gateway 10 according to Embodiment 2, if the IG switch 4 is changed from OFF to ON, or if a predetermined cycle has passed since the previous transmission, for example, the history information transmission unit 11h of the processing unit 11 determines whether or not the timing to transmit the history information 12b has come (step S81). If the timing of the transmission of the history information 12b has not come (NO in step S81), the history information transmission unit 11h waits until the transmission timing comes.

If the transmission timing has come (YES in step S81), then the history information transmission unit 11h collects information about the types of ECUs 2 connected to the communication lines 1a and 1b and the versions of the programs 22a, and generates system configuration information (step S82). Also, the history information transmission unit 11h retrieves the history information 12b stored in the storage unit 12 (step S83). The history information transmission unit 11h adds the system configuration information generated in step S82 to the history information 12b retrieved in step S83, transmits the history information 12b to the server device 9 (step S84), and ends processing.

Figure 17:
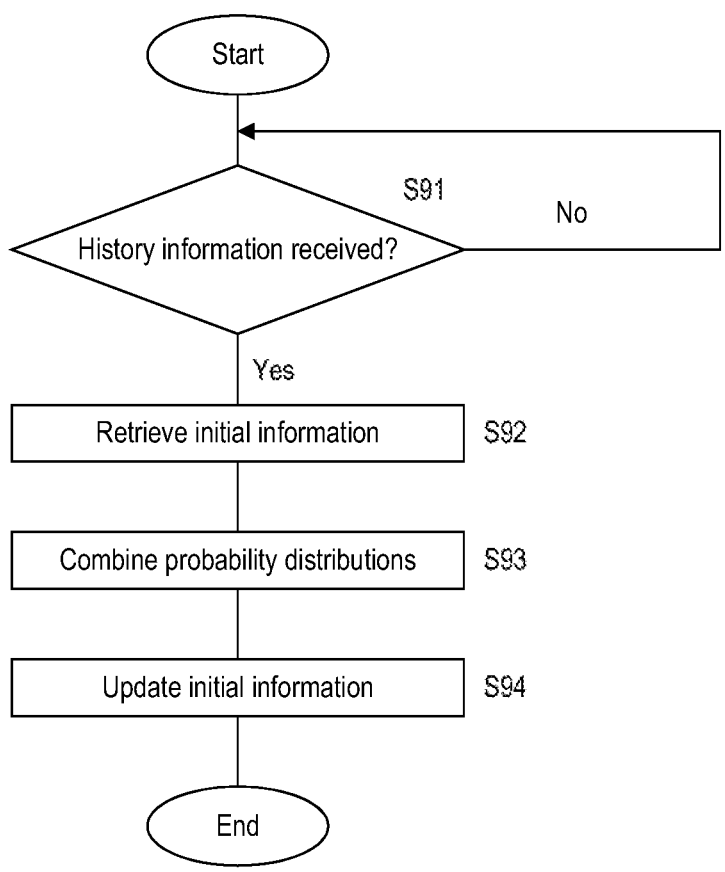
FIG. 17 is a flowchart of an initial information update process, showing process steps performed by the server device according to Embodiment 2.

FIG. 17 is a flowchart of an initial information update process, showing process steps performed by the server device 9 according to Embodiment 2. In the server device 9 according to Embodiment 2, the history information receiving unit 91b of the processing unit 91 determines whether or not the history information 12b transmitted from the gateway 10 of the vehicle 1 has been received (step S91). If no history information 12b has been received (NO in step S91), then the history information receiving unit 91b waits until the history information receiving unit 91b receives the history information 12b.

If the history information 12b has been received from the vehicle 1 (YES in S91), then the initial information update unit 91c retrieves, from the initial information DB 92b of the storage unit 92, initial information based on the system configuration information received together with the history information 12b (step S92). The initial information update unit 91c generates information about a new probability distribution by combining the probability distribution received from the vehicle 1 as the history information 12b, and the probability distribution retrieved in step S92 as initial information (step S93). The initial information update unit 91c updates initial information by storing, as new initial information, the generated information about the probability distribution in the initial information DB 92b of the storage unit 92 (step S94), and ends processing.

In the on-board update system 100 having the above-described configuration according to Embodiment 2, the gateway 10 acquires initial information about a probability distribution used in an estimation process, from the server device 9 provided outside the vehicle 1, updates the acquired initial information, and generates information about a new probability distribution. Accordingly, even if an update process needs to be performed immediately after the vehicle 1 is manufactured, or immediately after the vehicle 1 is sold, for example, and before sufficient history information 12b is stored, the gateway 10 can determine the timing of the transmission of update data based on the initial information.

Also, the gateway 10 according to Embodiment 2 transmits the history information 12b stored in the storage unit 12 to the server device 9. Accordingly, the server device 9 can generate more accurate initial information based on the history information 12b obtained from a plurality of vehicles 1, for example, and can deliver the more accurate initial information.

Note that, although the gateway 10 is configured to acquire initial information from the server device 9 in the on-board update system 100 according to Embodiment 2, there is no limitation thereto, and a configuration may also be adopted in which initial information is stored as the history information 12b in the storage unit 12 of the gateway 10 in the process of manufacturing the vehicle 1, or in the process of manufacturing the gateway 10, for example. Also, although the gateway 10 is configured to acquire initial information from the server device 9 if no history information 12b is stored in the storage unit 12, there is no limitation thereto, and a configuration may also be adopted in which initial information is acquired from the server device 9 according to the other conditions. If the timing of data transmission and reception in the vehicle 1 may be changed by updating the ECUs 2, for example, the gateway 10 may discard the history information 12b that is stored before the update process, and acquire initial information corresponding to a new system configuration from the server device 9.

The other configurations in the on-board update system 100 according to Embodiment 2 are similar to those in the on-board update system 100 according to Embodiment 1. Hence, like components are given like reference numerals to omit their detailed description.

The embodiments that were disclosed here are to be considered in all aspects to be illustrative and not restrictive. The scope of the present disclosure is defined by the claims and not by the above description, and all changes that come within the meaning and range of equivalency of the claims are intended to be embraced therein.

The invention claimed is:

1. An on-board update device for updating a program or data stored in a storage unit of an on-board device installed in a vehicle, the on-board update device comprising:
    a communication unit configured to perform communication via a communication line connected to the on-board device;
    a generation processing unit configured to generate, based on timing when data has been transmitted and received to/from the communication line, information about a probability distribution of timing when data is transmitted and received to/from the communication line,
    a storage unit configured to store the information about the probability distribution generated by the generation processing unit;
    an estimation processing unit configured to estimate an unused time period in which no data is transmitted or received via the communication line, based on the information about the probability distribution stored in the storage unit; and
    an update processing unit configured to perform processing for transmitting, via the communication unit, data for updating the on-board device to the on-board device in the unused time period estimated by the estimation processing unit,
    wherein the estimation processing unit is configured to estimate, based on the information about the probability distribution, as the unused time period, a time period in which the probability that data is transmitted and received to/from the communication line is lower than a predetermined reference.

2. The on-board update device according to claim 1, wherein data that is transmitted and received via the communication line includes identification codes for identifying the data, and
    the generation processing unit is configured to generate information about a probability distribution for each identification code.

3. The on-board update device according to claim 2, wherein the generation processing unit is configured to generate information about the probability distribution by updating initial information about the probability distribution that has been input from a device outside the vehicle.

4. The on-board update device according claim 2, wherein the storage unit is configured to store the information about the probability distribution for each state of the vehicle.

5. The on-board update device according to claim 1, wherein the generation processing unit is configured to generate information about the probability distribution by updating initial information about the probability distribution that has been input from a device outside the vehicle.

6. The on-board update device according to claim 5, comprising:
    a probability distribution information transmission unit configured to transmit the information about the probability distribution stored in the storage unit to the external device.

7. The on-board update device according to claim 6, wherein the storage unit is configured to store the information about the probability distribution for each state of the vehicle.

8. The on-board update device according to claim 5, wherein the storage unit is configured to store the information about the probability distribution for each state of the vehicle.

9. The on-board update device according to claim 1, wherein the storage unit is configured to store the information about the probability distribution for each state of the vehicle.

10. An on-board update system comprising an on-board update device configured to update a program or data stored in a storage unit of an on-board device installed in a vehicle, and a server device that is provided outside the vehicle and is configured to communicate with the on-board update device, wherein the on-board update device comprises:
    a communication unit configured to perform communication via a communication line connected to the on-board device;

a generation processing unit configured to generate, based on timing when data has been transmitted and received to/from the communication line, information about a probability distribution of timing when data is transmitted and received to/from the communication line, a storage unit configured to store the information about the probability distribution generated by the generation processing unit;

an estimation processing unit configured to estimate an unused time period in which no data is transmitted or received via the communication line, based on the information about the probability distribution stored in the storage unit; and an update processing unit configured to perform processing for transmitting, via the communication unit, data for updating the on-board device to the on-board device in the unused time period estimated by the estimation processing unit, wherein the estimation processing unit is configured to estimate, based on the information about the probability distribution, as the unused time period, a time period in which the probability that data is transmitted and received to/from the communication line is lower than a predetermined reference.

11. The on-board update system according to claim 10, wherein the server device includes a delivering unit configured to deliver initial information about the probability distribution to the on-board update device, and the generation processing unit is configured to generate information about the probability distribution by updating the initial information delivered by the server device.

12. The on-board update system according to claim 11, wherein the on-board update device comprises a probability distribution information transmission unit configured to transmit the information about the probability distribution stored in the storage unit to the server device, the server device comprises:

a probability distribution information receiving unit configured to receive the information about the probability distribution transmitted from the on-board update device, and an initial information update unit configured to update the initial information based on the information about the probability distribution received by the probability distribution information receiving unit.

13. An update process method for updating a program or data stored in a storage unit of an on-board device installed in a vehicle, the update process method comprising:

generating, based on timing when data has been transmitted and received to/from a communication line connected to the on-board device, information about a probability distribution of timing when data is transmitted and received to/from the communication line, storing, in the storage unit, the generated information about the probability distribution;

estimating a time period in which the probability that data is transmitted and received to/from the communication line is lower than a predetermined reference, as an unused time period in which no data is transmitted or received via the communication line, based on the information about the probability distribution stored in the storage unit; and transmitting data for updating the on-board device in the estimated unused time period.

14. An update process program for causing a computer to perform processing for updating a program or data stored in a storage unit of an on-board device installed in a vehicle, the update process program causing the computer to perform processing for:

generating, based on timing when data has been transmitted and received to/from a communication line connected to the on-board device, information about a probability distribution of timing when data is transmitted and received to/from the communication line, storing, in the storage unit, the generated information about the probability distribution;

estimating a time period in which the probability that data is transmitted and received to/from the communication line is lower than a predetermined reference, as an unused time period in which no data is transmitted or received via the communication line, based on the information about the probability distribution stored in the storage unit; and transmitting data for updating the on-board device in the estimated unused time period.

* * * * *